(12) United States Patent
Ishii

(10) Patent No.: US 7,616,275 B2
(45) Date of Patent: Nov. 10, 2009

(54) ELECTRO-OPTICAL DEVICE SUBSTRATE, ELECTRO-OPTICAL DEVICE, AND ELECTRONIC APPARATUS

(75) Inventor: Tatsuya Ishii, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 12/026,263

(22) Filed: Feb. 5, 2008

(65) Prior Publication Data

US 2008/0186422 A1 Aug. 7, 2008

(30) Foreign Application Priority Data

Feb. 7, 2007 (JP) ............................. 2007-028199
Nov. 30, 2007 (JP) ............................. 2007-309961

(51) Int. Cl.
*G02F 1/1333* (2006.01)

(52) U.S. Cl. ........................ 349/110; 349/43; 349/44

(58) Field of Classification Search ............. 349/43–44, 349/110
See application file for complete search history.

(56) References Cited

FOREIGN PATENT DOCUMENTS

| JP | 2003-262888 | 9/2003 |
|---|---|---|
| JP | 2004-004722 | 1/2004 |
| JP | 3731447 | 10/2005 |

*Primary Examiner*—David Nelms
*Assistant Examiner*—Phu Vu
(74) *Attorney, Agent, or Firm*—Workman Nydegger

(57) ABSTRACT

An electro-optical device includes plural pixels in a matrix. Switching elements of the pixels extend in a first direction in which data lines extend. Switching elements of pixels that are adjacent in a second direction that intersects the first direction are shifted out of alignment in the first direction. Light shield layers are arranged to make one of parasitic capacitance or aperture ratio the same between pixels that are adjacent in the second direction.

11 Claims, 17 Drawing Sheets

FIG. 1
FIG. 2
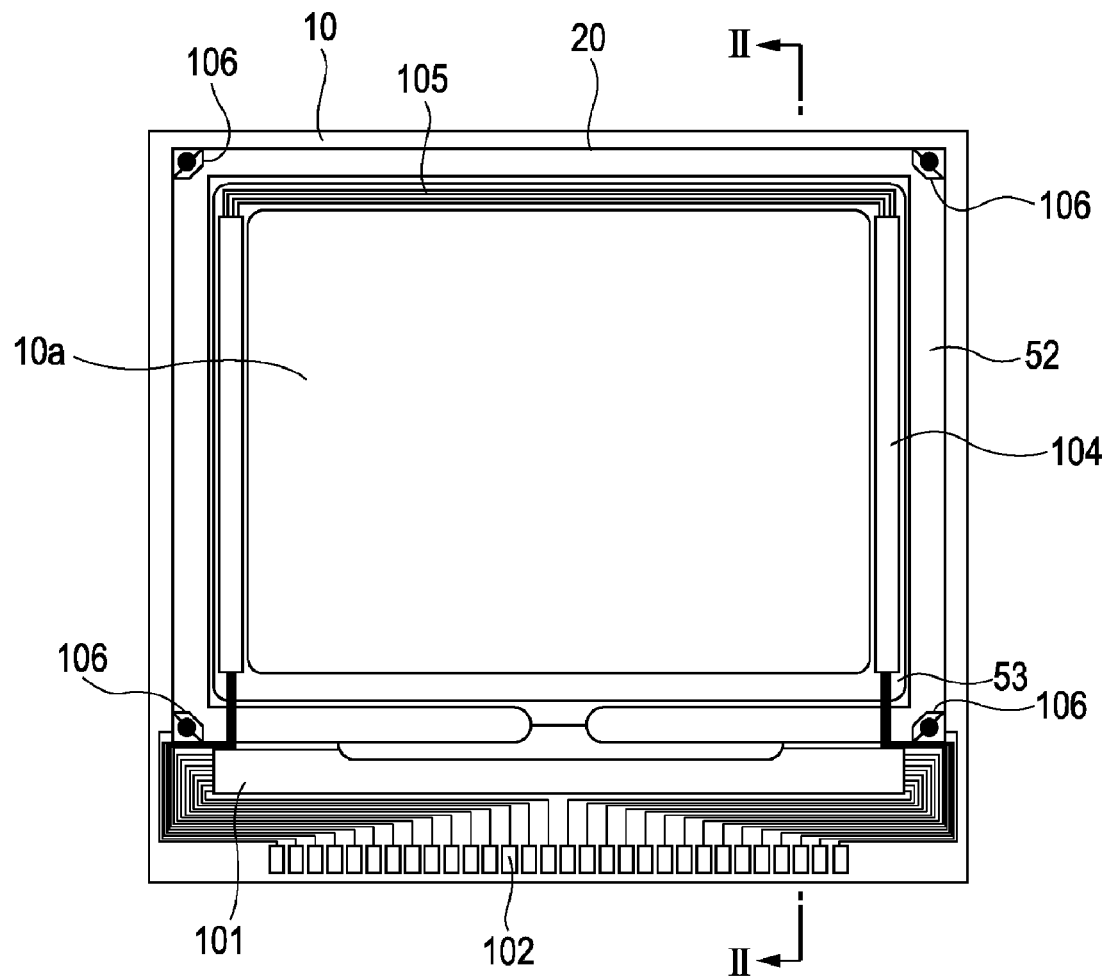
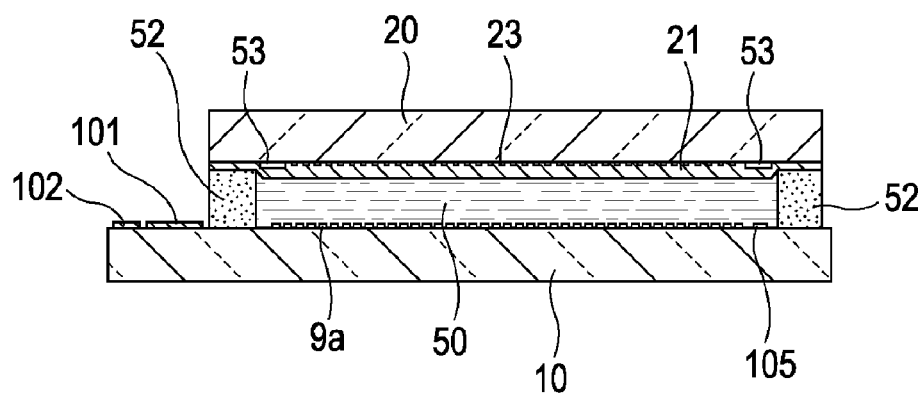

ELECTRO-OPTICAL DEVICE SUBSTRATE, ELECTRO-OPTICAL DEVICE, AND ELECTRONIC APPARATUS

BACKGROUND

1. Technical Field

The present invention relates to a technical field of an electro-optical device substrate used for an electro-optical device, such as a liquid crystal device, an electro-optical device that is provided with the electro-optical device substrate, and an electronic apparatus, such as a liquid crystal projector, that is provided with the electro-optical device.

2. Related Art

A liquid crystal device, which is an example of the above electro-optical device, is not only used for a direct view type display but also used widely, for example, as a light modulating device (light valve) of a projection-type display device. Particularly, when in a projection-type display device, because intensive light emitted from a light source enters a liquid crystal light valve, a light shielding film, which serves as a light shielding device that blocks incident light, is installed in the liquid crystal light valve so that a thin-film transistor (TFT) in the liquid crystal light valve does not cause an increase in leakage current and/or a malfunction, or the like, because of the intensive light. In regard to the above light shielding device or the light shielding film, JP-A-2004-4722 describes a technology for blocking light using a scanning line, which serves as a gate electrode, in a channel region of a TFT. Japanese Patent No. 3,731,447 describes that light that reaches the channel region of a TFT is reduced by providing a plurality of light shielding films formed on the channel region and a layer that absorbs internally reflected light. JP-A-2003-262888 describes a technology for reducing incident light that enters the channel region of a TFT as much as possible while making it possible to ensure an appropriate operation of the TFT and to reduce the width of a scanning line.

On the other hand, in the electro-optical device of such type, a holding capacitor is provided in a region in which a light shielding film is formed on a substrate, that is, in a region that does not allow transmission of light on the substrate, to hold the electric potential of a pixel electrode for a certain period of time by temporarily holding an image signal supplied to the pixel electrode. The above holding capacitor has an electrode, which is a component of the holding capacitor, that also serves as a light shielding film, so that the holding capacitor is able to shield a TFT against light.

However, when light is irradiated to a junction region of, for example, an LDD (Lightly Doped Drain) region, or the like, formed between a channel region and a source/drain region, there is a technical problem in which a light leakage current may be generated in the junction region. To address the above problem, it is conceivable that a light shielding device is provided on or above junction regions formed on both sides of the channel region. However, in terms of display performance, it is not preferable to reduce an aperture region through which light is substantially transmitted in each pixel. On the other hand, when light is irradiated to the junction region formed between the channel region and the source/drain region that is connected to a pixel electrode, in comparison with the case where light is irradiated to the junction region formed between the channel region and the source/drain region that is connected to a data line, the inventors of the invention estimate that a light leakage current is more likely to be generated in the TFT.

In addition, when the pattern of the light shielding film that shields semiconductor elements, such as pixel switching TFTs, is changed in order to reduce a light leakage current, there is a technical problem that it leads to a decrease in aperture ratio in each pixel or a decrease in contrast of an display image and, hence, the display performance of an electro-optical device is deteriorated.

On the other hand, in the electro-optical device of this type, there is a need for reducing a pitch at which pixels are arranged in order to reduce the size of the device and to realize a high-resolution display image.

Furthermore, to realize a high-quality image display, it is preferable that there is no variation in display characteristic among pixels.

SUMMARY

An advantage of some aspects of the invention is that, for example, in an electro-optical device, such as an active matrix addressing liquid crystal device, it provides an electro-optical device substrate used for an electro-optical device that is able to effectively reduce generation of a light leakage current and to realize a high aperture ratio and a high-resolution display image while making it possible to reduce variation in display characteristic among pixels, an electro-optical device that is provided with the electro-optical device substrate, and an electronic apparatus.

An aspect of the invention provides a first electro-optical device substrate. The first electro-optical device substrate includes a substrate, a plurality of data lines, a plurality of pixel electrodes, an element portion, a first light shielding portion, a second light shielding portion, a third light shielding portion, and a fourth light shielding portion. The plurality of data lines are provided on the substrate. The plurality of pixel electrodes are respectively formed in a plurality of pixels that form a pixel area on the substrate. In a non-aperture region that separates aperture regions of the plurality of pixels, the element portion is formed in a first region that extends along a first direction in which the data line extends and is also formed adjacent to the first region in a second direction that intersects with the first direction and is offset by one pixel along the first direction. Each element portion has a semiconductor layer. The semiconductor layer includes (i) a first data line side source/drain region that is electrically connected to a first data line of the plurality of data lines, the first data line extending along the first direction in the first region, (ii) a first channel region and a second channel region that are located on both sides of the first data line side source/drain region along the first direction, (iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the plurality of pixel electrodes, (iv) a first junction region that is formed between the first channel region and the first data line side source/drain region, (v) a second junction region that is formed between the first channel region and the first pixel electrode side source/drain region, (vi) a third junction region that is formed between the second channel region and the first data line side source/drain region, and (vii) a fourth junction region that is formed between the second channel region and the second pixel electrode side source/drain region. The first light shielding portion is formed in an upper layer side than the semiconductor layer along the first direction and covers the first junction region. The second light shielding portion is formed in an upper layer side than the semiconductor layer and covers the second junction region. The second light shielding portion has a width that is larger in the second direction than the first light shielding portion. The third light shielding portion is formed in an upper layer side than the semiconductor layer along the first direction and covers the third junction region. The fourth light shielding portion is formed in an upper layer side than the semiconductor layer and covers the fourth junction region. The fourth light shielding portion has a width that is larger in the second direction than the third light shielding portion. The first pixel electrode and the second pixel electrode are arranged, among the plurality of pixels, in the pixels in which the first light shielding portion and the third light shielding portion are formed and which are located adjacent to each other along the second direction.

With the first electro-optical device substrate according to the aspect of the invention, for example, image signals from the plurality of data lines to the plurality of pixel electrodes are controlled, and an image display by means of a so-called active matrix method may be obtained. Note that the image signals are supplied from the data line through the element portion to the pixel electrodes at a predetermined timing as the element portion that is electrically connected between the data line and the pixel electrodes are turned on/off. Each of the pixel electrodes is, for example, formed of transparent conductive material, such as ITO (Indium Tin Oxide). For example, the pixel electrodes are provided respectively in the plurality of pixels that are defined in a matrix at positions corresponding to intersections of the data lines and scanning lines. Thus, the pixel electrodes are arranged in a matrix.

Particularly, in the aspect of the invention, within the non-aperture region, a plurality of the element portions are formed respectively in a first region that extends along a first direction and in a second region that is located adjacent to the first region along a second direction that intersects with the first direction and that extends in the first direction, and the element portion formed in the first region is formed offset along the first direction by one pixel from the element portion formed in the second region. Thus, it is possible to uniform the aperture ratios of all the plurality of pixels that constitute the display area and also possible to prevent a decrease, as much as possible, in aperture ratio of each pixel, which decreases when a light shielding portion is formed. Here, the word "aperture region" according to the aspect of the invention is a region in a pixel through which light is substantially transmitted, and, for example, corresponds to a region in which a pixel electrode is formed and which is able to change the gray-scale of emitted light that has passed through an electro-optical material, such as a liquid crystal, in accordance with a change in transmittance ratio. In other words, "aperture region" means a region that does not block light by a light shielding body, such as a wiring, a light shielding film, and various elements, or the like, which has a light transmittance ratio smaller than a transparent electrode and does not allow light collected in a pixel to pass therethrough. The word "non-aperture region" means a region through which light that contributes to display is not transmitted and, for example, means a region in which a light shielding body, such as an opaque wiring, an electrode, various elements, or the like, is arranged in a pixel. The "first direction" according to the aspect of the invention means a direction in which each of the plurality of data lines extends and, for example, means a column direction (that is, Y direction) of the plurality of pixels that are defined in a matrix on the substrate. In other words, the "first direction" means an array direction in which the plurality of scanning lines are arranged.

Moreover, particularly, in the aspect of the invention, the first pixel electrode and the second pixel electrode are arranged, among the plurality of pixels, in the pixels in which the first light shielding portion and the third light shielding portion are formed and which are located adjacent to each other along the second direction. Thus, the area of portions at which the first pixel electrode overlaps the light shielding portions and the area of portions at which the second pixel electrode overlaps the light shielding portions may be made substantially or completely the same. Thus, it is possible to substantially or completely uniform the display characteristic of the pixel in which the first pixel electrode is provided and the display characteristic of the pixel in which the second pixel electrode is provided. As a result, it is possible to improve the quality of a display image.

In a specific aspect of the first electro-optical device substrate according to the invention, each of the first to fourth junction regions may be an LDD region.

According to the above aspect, when the element portion is not operating, it is possible to reduce an off electric current that flows between the first data line side source/drain region and the second pixel electrode side source/drain region, and between the first data line side source/drain region and the fourth pixel electrode side source/drain region, and also possible to suppress a decrease in on electric current that flows when the element portion is operating.

In another specific aspect of the first electro-optical device substrate according to the invention, each of the first to fourth light shielding portions may be arranged immediately above the element portion.

According to the above aspect, it is possible to reduce incident light that enters obliquely to the semiconductor layer between each light shielding portion and the element portion in a laminated structure on the substrate.

In yet another aspect of the first electro-optical device substrate according to the invention, the first and second light shielding portions may form a first capacitive element that includes a pair of first capacitor electrodes and a first dielectric film that is held between the pair of first capacitor electrodes, wherein the third and fourth light shielding portions may form a second capacitive element that includes a pair of second capacitor electrodes and a second dielectric film that is held between the pair of second capacitor electrodes, wherein the first capacitive element may hold an electric potential of the first pixel electrode when an image signal is supplied through the first data line to the first pixel electrode, and wherein the second capacitive element may hold an electric potential of the second pixel electrode when an image signal is supplied through the first data line to the second pixel electrode.

According to the above aspect, each of the first and second capacitive elements may be a holding capacitor that temporarily holds an electric potential of a corresponding one of the first and second pixel electrodes. When the first capacitive element is formed using the first and second light shielding portions and the second capacitive element is formed using the third and fourth light shielding portions, it is possible to simplify the circuit configuration of the electro-optical device substrate and the layout of wirings that constitute the circuit in comparison with the case where an additional light shielding film is separately provided.

In the above aspect in which the above described first to fourth light shielding portions form the first and second capacitive elements, at least one pair of capacitor electrodes between the pair of first capacitor electrodes and the pair of second capacitor electrodes may be formed to include a conductive light shielding film.

In this case, it is possible to reliably block light that will enter from the upper layer side of the semiconductor layer, for example, by the first and second capacitive elements that may be arranged in proximity to the semiconductor layer in an upper layer side of the element portion through an interlayer insulating film.

An aspect of the invention provides a second electro-optical device substrate. The second electro-optical device substrate includes a substrate, a plurality of data lines, a plurality of pixel electrodes, an element portion, a first light shielding portion, a second light shielding portion, a third light shielding portion, and a fourth light shielding portion. The plurality of data lines are provided on the substrate. The plurality of pixel electrodes are respectively formed in a plurality of pixels that form a pixel area on the substrate. In a non-aperture region that separates aperture regions of the plurality of pixels, the element portion is formed in a first region that extends along a first direction in which the data line extends and is also formed adjacent to the first region in a second direction that intersects with the first direction and is offset by one pixel along the first direction. Each element portion has a semiconductor layer. The semiconductor layer includes (i) a first data line side source/drain region that is electrically connected to a first data line of the plurality of data lines, the first data line extending along the first direction in the first region, (ii) a first channel region and a second channel region that are located on both sides of the first data line side source/drain region along the first direction, (iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the plurality of pixel electrodes, (iv) a first junction region that is formed between the first channel region and the first data line side source/drain region, (v) a second junction region that is formed between the first channel region and the first pixel electrode side source/drain region, (vi) a third junction region that is formed between the second channel region and the first data line side source/drain region, and (vii) a fourth junction region that is formed between the second channel region and the second pixel electrode side source/drain region. The first light shielding portion is formed in an upper layer side than the semiconductor layer along the first direction and covers the first junction region. The second light shielding portion is formed in an upper layer side than the semiconductor layer and covers the second junction region. The second light shielding portion has a width that is larger in the second direction than the first light shielding portion. The third light shielding portion is formed in an upper layer side than the semiconductor layer along the first direction and covers the third junction region. The fourth light shielding portion is formed in an upper layer side than the semiconductor layer and covers the fourth junction region. The fourth light shielding portion has a width that is larger in the second direction than the third light shielding portion. The first pixel electrode is arranged, among the plurality of pixels, in any one of the pixels in which the second light shielding portion is formed and which are located adjacent to each other along the second direction. The second pixel electrode is arranged, among the plurality of pixels, in any one of the pixels in which the fourth light shielding portion is formed and which are located adjacent to each other along the second direction.

With the second electro-optical device substrate according to the aspect of the invention, similarly in the case of the first electro-optical device substrate according to the above described invention, an image display by means of a so-called active matrix method may be obtained.

Particularly, in the aspect of the invention, as in the case of the first electro-optical device substrate according to the above described invention, within the non-aperture region, a plurality of the element portions are formed respectively in a first region that extends along a first direction and in a second region that is located adjacent to the first region along a second direction that intersects with the first direction and that extends in the first direction, and the element portion formed in the first region is formed offset along the first direction by one pixel from the element portion formed in the second region. Thus, it is possible to uniform the aperture ratios of all the plurality of pixels that constitute the display area and also possible to prevent a decrease, as much as possible, in aperture ratio of each pixel, which decreases when a light shielding portion is formed.

Particularly, in the aspect of the invention, the first pixel electrode is arranged, among the plurality of pixels, in any one of the pixels in which the second light shielding portion is formed and which are located adjacent to each other along the second direction, and the second pixel electrode is arranged, among the plurality of pixels, in any one of the pixels in which the fourth light shielding portion is formed and which are located adjacent to each other along the second direction. That is, the first pixel electrode is arranged uniformly in the pixel, among the plurality of pixels, that overlaps the second light shielding portion that covers the second junction region of the element portion to which the first pixel electrode is electrically connected, and the second pixel electrode is arranged uniformly in the pixel, among the plurality of pixels, that overlaps the fourth light shielding portion that covers the fourth junction region of the element portion to which the second pixel electrode is electrically connected. Thus, the area of portions at which the first pixel electrode overlaps the light shielding portions and the area of portions at which the second pixel electrode overlaps the light shielding portions may be made substantially or completely the same. Thus, it is possible to substantially or completely uniform the display characteristic of the pixel in which the first pixel electrode is provided and the display characteristic of the pixel in which the second pixel electrode is provided. As a result, it is possible to improve the quality of a display image.

An aspect of the invention provides a first electro-optical device that is provided with the first or second electro-optical device substrate (including its various specific aspects) according to the above described aspect of the invention.

With the first electro-optical device according to the aspect of the invention, because the first or second electro-optical device substrate according to the above described aspect of the invention is provided, it is possible to perform high-quality image display.

An aspect of the invention provides a first electronic apparatus that is provided with the first electro-optical device (including its various specific aspects) according to the above described aspect of the invention.

According to the first electronic apparatus of the aspect of the invention, because it is provided with the above described first electro-optical device according to the invention, it is possible to realize various electronic apparatuses that are able to perform high-quality image display, such as a projection display device, a television, a cellular phone, a personal organizer, a word processor, a viewfinder type or a direct view type video tape recorder, a workstation, a video telephone, a point-of-sales terminal, or a touch panel. In addition, as the first electronic apparatus according to the aspect of the invention, it is possible to, for example, realize an electrophoretic device, or the like, such as an electronic paper, an electron emission device, such as a field emission display and a conduction electron-emitter display, and a display device that uses the electrophoretic device or the electron emission device.

An aspect of the invention provides a third electro-optical device substrate. The third electro-optical device substrate includes a substrate, a plurality of data lines, a plurality of scanning lines, a plurality of pixel electrodes, a first element portion, a second element portion, a first light shielding portion, a second light shielding portion, a third light shielding portion, a fourth light shielding portion, a fifth light shielding portion, a sixth light shielding portion, a seventh light shielding portion, and an eighth light shielding portion. The plurality of data lines and the plurality of scanning lines intersect with each other on the substrate. The plurality of pixel electrodes are respectively formed in a plurality of pixels that are defined at positions corresponding to intersections of the plurality of data lines and the plurality of scanning lines and that form a display area on the substrate. In a non-aperture region that separates aperture regions of the plurality of pixels, the first element portion is formed in a first region that extends along a first direction, in which the data line extends, along the first direction. The first element portion has a first semiconductor layer. The first semiconductor layer includes (i) a first data line side source/drain region that is electrically connected to a first data line of the plurality of data lines, the first data line extending along the first direction in the first region, (ii) a first channel region and a second channel region that are located on both sides of the first data line side source/drain region along the first direction, (iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the plurality of pixel electrodes, (iv) a first junction region that is formed between the first channel region and the first data line side source/drain region, (v) a second junction region that is formed between the first channel region and the first pixel electrode side source/drain region, (vi) a third junction region that is formed between the second channel region and the first data line side source/drain region, and (vii) a fourth junction region that is formed between the second channel region and the second pixel electrode side source/drain region. In the non-aperture region, the second element portion is formed in a second region that is located adjacent to the first region along a second direction that intersects with the first direction and that extends in the first direction. The second element portion is formed offset by one pixel along the first direction as viewed from the first element portion. The second element portion has a second semiconductor layer. The second semiconductor layer includes (viii) a second data line side source/drain region that is electrically connected to a second data line of the plurality of data lines, the second data line extending along the first direction in the second region, (ix) a third channel region that is formed on a side on which the first channel region is formed as viewed from the second data line side source/drain region in the first direction and a fourth channel region that is formed on a side on which the second channel region is formed, (x) a third pixel electrode side source/drain region and a fourth pixel electrode side source/drain region that are respectively located on the outer side of the third channel region and on the outer side of the fourth channel region along the first direction as viewed from the second data line side source/drain region and electrically connected respectively to a third pixel electrode and a fourth pixel electrode that are different from each other among the plurality of pixel electrodes, (xi) a fifth junction region that is formed between the third channel region and the second data line side source/drain region, (xii) a sixth junction region that is formed between the third channel region and the third pixel electrode side source/drain region, (xiii) a seventh junction region that is formed between the fourth channel region and the second data line side source/drain region, and (xiv) an eighth junction region that is formed between the fourth channel region and the fourth pixel electrode side source/drain region. The first light shielding portion is formed in an upper layer side than the first semiconductor layer along the first direction and covers the first junction region. The second light shielding portion is formed in an upper layer side than the first semiconductor layer and covers the second junction region. The second light shielding portion has a width that is larger in the first second direction than the first light shielding portion. The third light shielding portion is formed in an upper layer side than the first semiconductor layer along the first direction and covers the third junction region. The fourth light shielding portion is formed in an upper layer side than the first semiconductor layer and covers the fourth junction region. The fourth light shielding portion has a width that is larger in the second direction than the third light shielding portion. The fifth light shielding portion is formed in an upper layer side than the second semiconductor layer along the first direction and covers the fifth junction region. The sixth light shielding portion is formed in an upper layer side than the second semiconductor layer and covers the sixth junction region. The sixth light shielding portion has a width that is larger in the second direction than the fifth light shielding portion. The seventh light shielding portion is formed in an upper layer side than the second semiconductor layer along the first direction and covers the seventh junction region. The eighth light shielding portion is formed in an upper layer side than the second semiconductor layer and covers the eighth junction region. The eighth light shielding portion has a width that is larger in the second direction than the seventh light shielding portion. The first pixel electrode and the second pixel electrode are arranged, among the plurality of pixels, in the pixels in which the first light shielding portion and the third light shielding portion are formed and which are located adjacent to each other along the second direction. The third pixel electrode and the fourth pixel electrode are arranged, among the plurality of pixels, in the pixels in which the fifth light shielding portion and the seventh light shielding portion are formed and which are located adjacent to each other along the second direction.

With the third electro-optical device substrate according to the aspect of the invention, for example, image signals from the plurality of data lines to the plurality of pixel electrodes are controlled, and an image display by means of a so-called active matrix method may be obtained. Note that the image signals are supplied from the data lines through the first element portion and the second element portion to the pixel electrodes at a predetermined timing as the first element portion and the second element portion that are electrically connected between the data lines and the pixel electrodes are turned on/off. Each of the pixel electrodes is, for example, formed of transparent conductive material, such as ITO (Indium Tin Oxide). For example, the pixel electrodes are respectively provided in the plurality of pixels that are defined in a matrix at positions corresponding to intersections of the data lines and the scanning lines. Thus, the pixel electrodes are arranged in a matrix.

The first element portion is formed along the first direction in a first region that extends along the first direction, in which the data line extends, within the non-aperture region that separates the aperture regions of the plurality of pixels. Here, the word "aperture region" according to the aspect of the invention is a region in a pixel through which light is substantially transmitted, and, for example, corresponds to a region in which a pixel electrode is formed and which is able to change the gray-scale of emitted light that has passed through an electro-optical material, such as a liquid crystal, in accordance with a change in transmittance ratio. In other words, "aperture region" means a region that does not block the light by light shielding body, such as a wiring, a light shielding film, and various elements, or the like, which has a light transmittance ratio smaller than a transparent electrode and does not allow light collected in a pixel to pass therethrough. The word "non-aperture region" means a region through which light that contributes to display is not transmitted and, for example, means a region in which a light shielding body, such as an opaque wiring, an electrode, various elements, or the like, is arranged in a pixel. The "first direction" according to the aspect of the invention means a direction in which each of the plurality of data lines extends and, for example, means a column direction (that is, Y direction) of the plurality of pixels that are defined in a matrix on the substrate. In other words, the "first direction" means an array direction in which the plurality of scanning lines are arranged.

The first semiconductor layer, for example, constitutes part of two transistor elements that share the first data line side source/drain region. In the first element portion, for example, the first data line side source/drain region is shared by the two transistor elements that are located adjacent to each other along the first direction. The first pixel electrode side source/drain region and the second pixel electrode side source/drain region are respectively connected to the first pixel electrode and the second pixel electrode. These two transistor elements, when the electro-optical device provided with the electro-optical device substrate is operating, respectively supply image signals to the first pixel electrode and the second pixel electrode, which are different from each other, through the first pixel electrode side source/drain region and the second pixel electrode side source/drain region.

In the first semiconductor layer, the first junction region is formed between the first channel region and the first data line side source/drain region, the second junction region is formed between the first channel region and the first pixel electrode side source/drain region, the third junction region is formed between the second channel region and the first data line side source/drain region, and the fourth junction region is formed between the second channel region and the second pixel electrode side source/drain region. The first junction region is a region that is formed at a junction portion between the first channel region and the first data line side source/drain region. The second junction region is a region that is formed at a junction portion between the first channel region and the first pixel electrode side source/drain region. The third junction region is a region that is formed at a junction portion between the second channel region and the first data line side source/drain region. The fourth junction region is a region that is formed at a junction portion between the second channel region and the second pixel electrode side source/drain region. That is, each of the first to fourth junction regions means, for example, a PN junction region when a transistor element is formed as, for example, a PNP transistor or an NPN transistor (that is, a P-channel transistor or an N-channel transistor) or an LDD region when a transistor element has an LDD structure (that is, impurity regions that are formed by implanting impurities into the semiconductor layer by means of impurity implantation, such as ion implantation, for example).

The two transistor elements included in the first element portion are formed in mirror symmetry along the first direction with respect to the first data line side source/drain region. For this reason, in comparison with the case where the data line side source/drain region is formed in each transistor element, it is possible to reduce the area occupied by these two transistor elements along the first direction and also possible to reduce a pitch at which the pixels are arranged along the first direction.

The second element portion is formed along the first direction in a second region that is located adjacent to the first region along a second direction that intersects with the first direction, in which the data line extends, within the non-aperture region that separates the aperture regions of the plurality of pixels. Here, the "second direction" according to the aspect of the invention means a direction that intersects with the first direction and, for example, means a row direction (that is, X direction) of the plurality of pixels that are defined in a matrix on the substrate. In other words, the "second direction" means an array direction in which the plurality of data lines are arranged.

The second semiconductor layer, for example, constitutes part of two transistor elements that share the second data line side source/drain region. In the second element portion, for example, the second data line side source/drain region is shared by the two transistor elements that are located adjacent to each other along the first direction. The third pixel electrode side source/drain region and the fourth pixel electrode side source/drain region are respectively connected to the third pixel electrode and the fourth pixel electrode. These two transistor elements, when the electro-optical device provided with the electro-optical device substrate is operating, respectively supply image signals to the third pixel electrode and the fourth pixel electrode, which are located adjacent to each other along the first direction, through the third pixel electrode side source/drain region and the fourth pixel electrode side source/drain region.

In the second semiconductor layer, the fifth junction region is formed between the third channel region and the second data line side source/drain region, the sixth junction region is formed between the third channel region and the third pixel electrode side source/drain region, the seventh junction region is formed between the fourth channel region and the second data line side source/drain region, and the eighth junction region is formed between the fourth channel region and the fourth pixel electrode side source/drain region. The fifth to eighth junction regions have the same configuration as the above described first to fourth junction regions.

The two transistor elements included in the second element portion are formed in mirror symmetry along the first direction with respect to the second data line side source/drain region. For this reason, in comparison with the case where the data line side source/drain region is formed in each transistor element, it is possible to reduce the area occupied by these two transistor elements along the first direction and also possible to reduce a pitch at which the pixels are arranged along the first direction.

The first light shielding portion is formed in an upper layer side in a laminated structure on the substrate than the first semiconductor layer along the first direction and covers the first junction region. The second light shielding portion is formed in an upper layer side than the first semiconductor layer and covers the second junction region. The third light shielding portion is formed in an upper layer side than the first semiconductor layer along the first direction and covers the third junction region. The fourth light shielding portion is formed in an upper layer side than the first semiconductor layer and covers the fourth junction region. Thus, it is possible to block light that will enter from the upper layer side to the first to fourth junction regions by the first to fourth light shielding portions, respectively, and thereby possible to reduce generation of a light leakage current in the first to fourth junction regions.

Particularly, in the aspect of the invention, the second light shielding portion that covers the second junction region is configured to have a width that is larger in the second direction, which intersects with the first direction, than the first light shielding portion that covers the first junction region. That is, the second light shielding portion is configured to, for example, have a width that is larger in the X direction than the first light shielding portion, for example, for the first semiconductor layer that extends in the Y direction. In other words, the second light shielding portion has an extended portion that extends longer along the second direction than the first light shielding portion. Thus, it is possible to more reliably block light that will enter the second junction region than light that will enter the first junction region. That is, it is possible to improve (that is, enhance) the light shielding property to block light that will reach the second junction region more than the light shielding property to block light that will reach the first junction region.

Furthermore, the fourth light shielding portion that covers the fourth junction region is configured to have a width that is larger in the second direction, which intersects with the first direction, than the third light shielding portion that covers the third junction region. Thus, it is possible to more reliably block light that will enter the fourth junction region than light that will enter the third junction region.

Here, the inventors estimate that, when the transistor is operating, a light leakage current is more likely to be generated in the junction region formed between the channel region and the pixel electrode side source/drain region than the junction region formed between the channel region and the data line side source/drain region. That is, the inventors estimate that, when the first element portion is operating, a light leakage current is more likely to occur in the second junction region than in the first junction region, and also estimates that a light leakage current is more likely to occur in the fourth junction region than in the third junction region. Thus, when the second light shielding portion is formed to have a width that is larger than the first light shielding portion and the fourth light shielding portion is formed to have a width that is larger than the third light shielding portion, it is possible to improve the light shielding property to the second and fourth junction regions at which a light leakage current is more likely to occur and thereby possible to effectively reduce a light leakage current that flows through the first element portion. Conversely, the first and third light shielding portions respectively cover the first and third junction regions at which a light leakage current is less likely to occur, in comparison with the second and fourth junction regions. When the first and third light shielding portions are respectively formed to have widths that are smaller than the second and fourth light shielding portions, it is possible to prevent an unnecessary decrease in aperture ratio.

Thus, by forming the second and fourth light shielding portions to have large widths, it is possible to improve the light shielding property to the second and fourth junction regions at which a light leakage current is more likely to occur, while, by forming the first and third light shielding portions to have small widths, it is possible to prevent an unnecessary decrease in aperture ratio. That is, by improving the light shielding property pinpoint to the second and fourth junction regions at which a light leakage current is likely to occur, it is possible to effectively reduce a light leakage current generated in the first element portion without an unnecessary decrease in aperture ratio. Here, the "aperture ratio" means a ratio of the aperture region to the size of an pixel that totals the aperture region and the non-aperture region. As the aperture ratio increases, the display performance of the electro-optical device that is provided with the electro-optical device substrate according to the aspect of the invention is improved.

Note that each of the first to fourth light shielding portions and the fifth to eighth light shielding portions, which will be described later, may be a film-shaped light shielding body that is formed of a monolayer or a multilayer and that has a light shielding property as in the case of a light shielding film, or may be various elements that include an electrode having a light shielding property.

The fifth light shielding portion is formed in an upper layer side than the second semiconductor layer along the first direction and covers the fifth junction region. The sixth light shielding portion is formed in an upper layer side than the second semiconductor layer and covers the sixth junction region. The sixth light shielding portion has a width that is larger in the second direction than the fifth light shielding portion. The seventh light shielding portion is formed in an upper layer side than the second semiconductor layer along the first direction and covers the seventh junction region. The eighth light shielding portion is formed in an upper layer side than the second semiconductor layer and covers the eighth junction region. The eighth light shielding portion has a width that is larger in the second direction than the seventh light shielding portion. Thus, according to the fifth to eighth light shielding portions, as in the case of the first to fourth light shielding portions, it is possible to shield the fifth to eighth junction regions, and thereby possible to reduce generation of a light leakage current in the fifth to eighth junction regions. Particularly, according to the sixth and eighth light shielding portions, as in the case of the second and fourth light shielding portions, because it is possible to block light pinpoint to the sixth and eighth junction regions at which a light leakage current is likely to be generated in comparison with the fifth and seventh junction regions, it is possible to effectively reduce a light leakage current generated in the second element portion without an unnecessary decrease in aperture ratio.

Here, in the third electro-optical device substrate according to the aspect of the invention, because the first to eighth light shielding portions are provided, if the first element portion and the second element portion are merely arranged along the second direction without any measures being taken, there is a difference in aperture ratio in the pixels that are located adjacent to each other along the first direction. More specifically, the first element portion supplies image signals to two pixel electrodes that are located adjacent to each other along the first direction in the first region, and the second element portion supplies image signals to two pixel electrodes that are located adjacent to each other along the first direction in the second region. Thus, if the first element portion and the second element portion are arranged in the same row along the second direction, for example, a direction in which the scanning line extends (that is, along the X direction), the first light shielding portion, the third light shielding portion, the fifth light shielding portion and the seventh light shielding portion are arranged in one of the two pixels that are located adjacent to each other along the first direction, for example, the Y direction in which the data line extends, while the second light shielding portion, the fourth light shielding portion, the sixth light shielding portion and the eighth light shielding portion having a width that is larger in the second direction than the first light shielding portion, the third light shielding portion, the fifth light shielding portion and the seventh light shielding portion are arranged in the other one of the two pixels. According to the above light shielding portions, the aperture ratio in the other one of the two pixels is smaller than the aperture ratio in the one of the two pixels and, therefore, there is a difference in aperture ratio between the two pixels that are located adjacent to each other along the Y direction in accordance with a difference in width of the light shielding portion. When there is the above difference in aperture ratio all over the plurality of pixels that form the display area, in comparison with the case where no light shielding portion is provided, there is a display chrominance non-uniformity and, hence, the display performance of the electro-optical device provided with the electro-optical device substrate is decreased.

Then, particularly, in the aspect of the invention, within the non-aperture region, the second element portion is formed offset along the first direction by one pixel as viewed from the first element portion in the second region that is located adjacent to the first region along the second direction that intersects with the first direction and that extends in the first direction. That is, the first element portion and the second element portion are arranged offset from each other in the first direction, for example, in the Y direction in which the data line extends. Thus, the first to eighth light shielding portions are arranged offset to one another along the first direction so as to cover the junction regions that should be shielded by the light shielding portions. More specifically, the second light shielding portion (and the fourth light shielding portion) overlaps one pixel of the two pixels that are located adjacent to each other along the first direction, and the sixth light shielding portion (and the eighth light shielding portion) overlaps the other one of the two pixels. Thus, it is possible to uniform the aperture ratios of all the plurality of pixels that constitute the display area and also possible to, as much as possible, prevent a decrease in aperture ratio of each pixel, which decreases because of a light shielding portion being formed.

Moreover, particularly, in the aspect of the invention, the first pixel electrode and the second pixel electrode are arranged, among the plurality of pixels, in the pixels in which the first light shielding portion and the third light shielding portion are formed and which are located adjacent to each other along the second direction. That is, the first pixel electrode and the second pixel electrode that are electrically connected to the first element portion are provided, among the plurality of pixel electrodes, as the pixel electrodes that are located adjacent to each other along the second direction (that is, X direction) while the first pixel electrode and the second pixel electrode each overlap the first light shielding portion and the third light shielding portion that respectively cover the first junction region and the third junction region of the first element portion as viewed in plan on the substrate. In other words, the first pixel electrode side source/drain region and the second pixel electrode side source/drain region of the first element portion are electrically connected respectively to any one of two pixel electrodes, among the plurality of pixel electrodes that are arranged in a matrix, that are located adjacent to each other along the second direction and that overlap the first light shielding portion and the third light shielding portion that respectively cover the first junction region and the third junction region of the first element portion as viewed in plan on the substrate. That is, the first pixel electrode and the second pixel electrode each are provided so as to partly overlap the first light shielding portion and the third light shielding portion and not to overlap the second light shielding portion or the fourth light shielding portion, as viewed in plan on the substrate. That is, the first pixel electrode and the second pixel electrode are arranged uniformly in the pixels, among the plurality of pixels, that each overlap the first and third light shielding portions that respectively cover the first and third junction regions of the first element portion to which the first and second pixel electrodes are electrically connected.

Here, if the first and second pixel electrodes are provided as the pixel electrodes that are located adjacent to each other along the first direction (that is, Y direction), that is, for example, the first pixel electrode is provided as the pixel electrode that partly overlaps the second light shielding portion that has a width that is larger in the second direction than the first light shielding portion and the second pixel electrode is provided as the pixel electrode that partly overlaps the first light shielding portion, the area of portions at which the first pixel electrode overlaps the light shielding portions and the area of portions at which the second pixel electrode overlaps the light shielding portions are different from each other. Thus, for example, the parasitic capacitance, formed between the first data line that is electrically connected to the first element portion and the first pixel electrode, and the parasitic capacitance, formed between the first data line and the second pixel electrode, are different from each other. Moreover, in this case, the parasitic capacitance, formed between the second data line that is located adjacent to the first data line that is electrically connected to the first element portion (in other words, the second data line that is electrically connected to the second element portion) and the first pixel electrode, and the parasitic capacitance, formed between the second data line and the second pixel electrode, are different from each other. Therefore, there is a possibility that the electric potential holding characteristic in the first pixel electrode and the electric potential holding characteristic in the second pixel electrode will be different from each other. Thus, there is a possibility that the display characteristic of the pixel in which the first pixel electrode is provided and the display characteristic of the pixel in which the second pixel electrode is provided will be different from each other.

Then, particularly, in the aspect of the invention, as described above, the first pixel electrode and the second pixel electrode are arranged, among the plurality of pixels, in the pixels in which the first light shielding portion and the third light shielding portion are formed and which are located adjacent to each other along the second direction. More specifically, because the first pixel electrode and the second pixel electrode each partly overlap the first light shielding portion and the third light shielding portion in plan view on the substrate and do not overlap the second light shielding portion or the fourth light shielding portion (in more detail, in this case, the first pixel electrode and the second pixel electrode each further partly overlap the sixth light shielding portion and the eighth light shielding portion and do not overlap the fifth light shielding portion or the seventh light shielding portion) the area of portions at which the first pixel electrode overlaps the light shielding portions and the area of portions at which the second pixel electrode overlaps the light shielding portions may be made substantially or completely the same. Thus, for example, it is possible to substantially or completely eliminate a difference between the parasitic capacitance, formed between the first data line that is electrically connected to the first element portion and the first pixel electrode, and the parasitic capacitance, formed between the first data line and the second pixel electrode. Moreover, it is possible to substantially or completely eliminate a difference between the parasitic capacitance, formed between the second data line that is located adjacent to the first data line that is electrically connected to the first element portion (in other words, the second data line that is electrically connected to the second element portion) and the first pixel electrode, and the parasitic capacitance, formed between the second data line and the second pixel electrode. In this manner, the electric potential holding characteristic in the first pixel electrode and the electric potential holding characteristic in the second pixel electrode may be made substantially or completely the same. As a result, it is possible to substantially or completely uniform the display characteristic of the pixel in which the first pixel electrode is provided and the display characteristic of the pixel in which the second pixel electrode is provided.

Moreover, particularly, in the aspect of the invention, the third pixel electrode and the fourth pixel electrode are arranged, among the plurality of pixels, in the pixels in which the fifth light shielding portion and the seventh light shielding portion are formed and which are located adjacent to each other along the second direction. That is, the third pixel electrode and the fourth pixel electrode that are electrically connected to the second element portion are provided, among the plurality of pixel electrodes, as the pixel electrodes that are located adjacent to each other along the second direction (that is, X direction) while the third pixel electrode and the fourth pixel electrode each overlap the fifth light shielding portion and the seventh light shielding portion that respectively cover the fifth junction region and the seventh junction region of the second element portion as viewed in plan on the substrate. That is, as in the case of the positional relationship between the first and second pixel electrodes and the first to fourth light shielding portions, the third pixel electrode and the fourth pixel electrode each partly overlap the fifth light shielding portion and the seventh light shielding portion and do not overlap the sixth light shielding portion or the eighth light shielding portion, as viewed in plan on the substrate. Thus, it is possible to substantially or completely uniform the display characteristic of the pixel in which the third pixel electrode is provided and the display characteristic of the pixel in which the fourth pixel electrode is provided.

Furthermore, the widths in the second direction of the first light shielding portion, the third light shielding portion, the fifth light shielding portion and the seventh light shielding portion are made substantially or completely the same, and the widths in the second direction of the second light shielding portion, the fourth light shielding portion, the sixth light shielding portion and the eighth light shielding portion are made substantially or completely the same. Thus, the display characteristics of the pixels provided in the first to fourth pixel electrodes may be further reliably made substantially or completely the same. That is, it is possible to substantially or completely uniform the display characteristics of the pixels that constitute the display area. As a result, it is possible to improve the quality of a display image.

As described above, in the third electro-optical device substrate according to the aspect of the invention, it is possible to reduce display defects, such as flicker, that may occur because of a light leakage current generated and also possible to reduce display defects because of a difference in aperture ratio among the pixels, without an unnecessary decrease in aperture ratio. Furthermore, it is possible to substantially or completely uniform the display characteristics in the pixels. As a result, with the electro-optical device substrate according to the aspect of the invention, a high-quality image display may be achieved.

In a specific aspect of the third electro-optical device substrate according to the invention, each of the first to eighth junction regions may be an LDD region.

According to the above aspect, when the first element portion and the second element portion are not operating, it is possible to reduce an off electric current that flows between the first data line side source/drain region and the second pixel electrode side source/drain region, and between the second data line side source/drain region and the fourth pixel electrode side source/drain region, and also possible to suppress a decrease in on electric current that flows when the first element portion is operating and/or the second element portion is operating.

In another specific aspect of the third electro-optical device substrate according to the invention, each of the first to eighth light shielding portions may be arranged immediately above the first element portion or the second element portion.

According to the above aspect, it is possible to reduce incident light that enters obliquely to the first semiconductor layer and the second semiconductor layer between each light shielding portion and the first element portion or the second element portion in a laminated structure on the substrate. More specifically, in comparison with the case where another light shielding film is interposed between each light shielding portion and the first element portion or the second element portion separately from these light shielding portions, it is possible to reduce a distance in a laminated direction between the light shielding portions and the first element portion or the second element portion and, by that much, it is possible to block light that will obliquely enter the first semiconductor layer and the second semiconductor layer at a large angle with respect to the direction of normal to these semiconductor layers by the light shielding portions.

In yet another aspect of the third electro-optical device substrate according to the invention, the first and second light shielding portions may form a first capacitive element that includes a pair of first capacitor electrodes and a first dielectric film that is held between the pair of first capacitor electrodes, wherein the third and fourth light shielding portions may form a second capacitive element that includes a pair of second capacitor electrodes and a second dielectric film that is held between the pair of second capacitor electrodes, wherein the fifth and sixth light shielding portions may form a third capacitive element that includes a pair of third capacitor electrodes and a third dielectric film that is held between the pair of third capacitor electrodes, wherein the seventh and eighth light shielding portions may form a fourth capacitive element that includes a pair of fourth capacitor electrodes and a fourth dielectric film that is held between the pair of fourth capacitor electrodes, wherein the first capacitive element may hold an electric potential of the first pixel electrode when an image signal is supplied through the first data line to the first pixel electrode, wherein the second capacitive element may hold an electric potential of the second pixel electrode when an image signal is supplied through the first data line to the second pixel electrode, wherein the third capacitive element may hold an electric potential of the third pixel electrode when an image signal is supplied through the second data line to the third pixel electrode, wherein the fourth capacitive element may hold an electric potential of the fourth pixel electrode when an image signal is supplied through the second data line to the fourth pixel electrode.

According to the above aspect, each of the first to fourth capacitive elements may be a holding capacitor that temporarily holds an electric potential of a corresponding one of the first to fourth pixel electrodes. When the first capacitive element is formed using the first and second light shielding portions, the second capacitive element is formed using the third and fourth light shielding portions, the third capacitive element is formed using the fifth and sixth light shielding portions, the fourth capacitive element is formed using the seventh and eighth light shielding portions, it is possible to simplify the circuit configuration of the electro-optical device substrate and the layout of wirings that constitute the circuit in comparison with the case where an additional light shielding film is separately provided.

In the above aspect in which the above described first to eighth light shielding portions form the first to fourth capacitive elements, at least one pair of capacitor electrodes among the pair of first capacitor electrodes, the pair of second capacitor electrodes, the pair of third capacitor electrodes and the pair of fourth capacitor electrodes may be formed to include a conductive light shielding film.

According to this aspect, it is possible to reliably block light that will enter from the upper layer sides of the first semiconductor layer and the second semiconductor layer by the first to fourth capacitive elements that may be arranged in proximity to the first element portion or in proximity to the second element portion in upper layer sides thereof through, for example, an interlayer insulating film. Note that the conductive light shielding film may be, for example, formed of conductive polysilicon, metal element substance, alloy, metal silicide, or polysilicide, which contains at least one of high-melting point metals, such as titanium (Ti), chromium (Cr), tungsten (W), tantalum (Ta) molybdenum (Mo), or a laminated structure of them, or tungsten silicide.

An aspect of the invention provides a fourth electro-optical device substrate. The fourth electro-optical device substrate includes a substrate, a plurality of data lines, a plurality of scanning lines, a plurality of pixel electrodes, a first element portion, a second element portion, a first light shielding portion, a second light shielding portion, a third light shielding portion, a fourth light shielding portion, a fifth light shielding portion, a sixth light shielding portion, a seventh light shielding portion, and an eighth light shielding portion. The plurality of data lines and the plurality of scanning lines intersect with each other on the substrate. The plurality of pixel electrodes are respectively formed in a plurality of pixels that are defined at positions corresponding to intersections of the plurality of data lines and the plurality of scanning lines and that form a display area on the substrate. In a non-aperture region that separates aperture regions of the plurality of pixels, the first element portion is formed in a first region that extends along a first direction, in which the data line extends, along the first direction. The first element portion has a first semiconductor layer. The first semiconductor layer includes (i) a first data line side source/drain region that is electrically connected to a first data line of the plurality of data lines, the first data line extending along the first direction in the first region, (ii) a first channel region and a second channel region that are located on both sides of the first data line side source/drain region along the first direction, (iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the plurality of pixel electrodes, (iv) a first junction region that is formed between the first channel region and the first data line side source/drain region, (v) a second junction region that is formed between the first channel region and the first pixel electrode side source/drain region, (vi) a third junction region that is formed between the second channel region and the first data line side source/drain region, and (vii) a fourth junction region that is formed between the second channel region and the second pixel electrode side source/drain region. In the non-aperture region, the second element portion is formed in a second region that is located adjacent to the first region along a second direction that intersects with the first direction and that extends in the first direction. The second element portion is formed offset by one pixel along the first direction as viewed from the first element portion. The second element portion has a second semiconductor layer. The second semiconductor layer includes (viii) a second data line side source/drain region that is electrically connected to a second data line of the plurality of data lines, the second data line extending along the first direction in the second region, (ix) a third channel region that is formed on a side on which the first channel region is formed as viewed from the second data line side source/drain region in the first direction and a fourth channel region that is formed on a side on which the second channel region is formed, (x) a third pixel electrode side source/drain region and a fourth pixel electrode side source/drain region that are respectively located on the outer side of the third channel region and on the outer side of the fourth channel region along the first direction as viewed from the second data line side source/drain region and electrically connected respectively to a third pixel electrode and a fourth pixel electrode that are different from each other among the plurality of pixel electrodes, (xi) a fifth junction region that is formed between the third channel region and the second data line side source/drain region, (xii) a sixth junction region that is formed between the third channel region and the third pixel electrode side source/drain region, (xiii) a seventh junction region that is formed between the fourth channel region and the second data line side source/drain region, and (xiv) an eighth junction region that is formed between the fourth channel region and the fourth pixel electrode side source/drain region. The first light shielding portion is formed in an upper layer side than the first semiconductor layer along the first direction and covers the first junction region. The second light shielding portion is formed in an upper layer side than the first semiconductor layer and covers the second junction region. The second light shielding portion has a width that is larger in the first second direction than the first light shielding portion. The third light shielding portion is formed in an upper layer side than the first semiconductor layer along the first direction and covers the third junction region. The fourth light shielding portion is formed in an upper layer side than the first semiconductor layer and covers the fourth junction region. The fourth light shielding portion has a width that is larger in the second direction than the third light shielding portion. The fifth light shielding portion is formed in an upper layer side than the second semiconductor layer along the first direction and covers the fifth junction region. The sixth light shielding portion is formed in an upper layer side than the second semiconductor layer and covers the sixth junction region. The sixth light shielding portion has a width that is larger in the second direction than the fifth light shielding portion. The seventh light shielding portion is formed in an upper layer side than the second semiconductor layer along the first direction and covers the seventh junction region. The eighth light shielding portion is formed in an upper layer side than the second semiconductor layer and covers the eighth junction region. The eighth light shielding portion has a width that is larger in the second direction than the seventh light shielding portion. The first pixel electrode is arranged, among the plurality of pixels, in any one of the pixels in which the second light shielding portion is formed and which are located adjacent to each other along the second direction. The second pixel electrode is arranged, among the plurality of pixels, in any one of the pixels in which the fourth light shielding portion is formed and which are located adjacent to each other along the second direction. The third pixel electrode is arranged, among the plurality of pixels, in any one of the pixels in which the sixth light shielding portion is formed and which are located adjacent to each other along the second direction. The fourth pixel electrode is arranged, among the plurality of pixels, in any one of the pixels in which the eighth light shielding portion is formed and which are located adjacent to each other along the second direction.

With the fourth electro-optical device substrate according to the aspect of the invention, similarly in the case of the third electro-optical device substrate according to the above described invention, an image display by means of a so-called active matrix method may be obtained.

Particularly, in the aspect of the invention, as in the case of the third electro-optical device substrate according to the above described invention, within the non-aperture region, the second element portion is formed offset by one pixel along the first direction as viewed from the first element portion in the second region that extends in the first direction and that is located adjacent to the first region along the second direction that intersects with the first direction. Thus, it is possible to uniform the aperture ratios of all the plurality of pixels that constitute the display area and also possible to, as much as possible, prevent a decrease in aperture ratio of each pixel, which decreases because of a light shielding portion being formed.

Moreover, particularly, in the aspect of the invention, the first pixel electrode is arranged, among the plurality of pixels, in any one of the pixels in which the second light shielding portion is formed and which are located adjacent to each other along the second direction, and the second pixel electrode is arranged, among the plurality of pixels, in any one of the pixels in which the fourth light shielding portion is formed and which are located adjacent to each other along the second direction. That is, the first pixel electrode and the second pixel electrode that are electrically connected to the first element portion are provided, among the plurality of pixel electrodes, as the pixel electrodes that respectively overlap the second light shielding portion and the fourth light shielding portion that respectively cover the second junction region and the fourth junction region of the first element portion as viewed in plan on the substrate. Here, the second light shielding portion is provided so as to cover the second junction region formed between the first channel region and the first pixel electrode side source/drain region, and the fourth light shielding portion is provided so as to cover the fourth junction region formed between the second channel region and the second pixel electrode side source/drain region, and then the second and fourth light shielding portions respectively have widths that are larger in the second direction than the first and third light shielding portions. In other words, the first pixel electrode side source/drain region and the second pixel electrode side source/drain region of the first element portion are electrically connected respectively to two pixel electrodes, among the plurality of pixel electrodes that are arranged in a matrix, that respectively overlap the second light shielding portion and the fourth light shielding portion that respectively have widths larger in the second direction than the first shielding portion and the third light shielding portion that respectively cover the first junction region and the third junction region of the first element portion as viewed in plan on the substrate. That is, the first pixel electrode and the second pixel electrode each are provided so as to partly overlap the second light shielding portion or the fourth light shielding portion and not to overlap the first light shielding portion or the third light shielding portion, as viewed in plan on the substrate. That is, the first pixel electrode is arranged uniformly in the pixel, among the plurality of pixels, that overlaps the second light shielding portion that covers the second junction region of the first element portion to which the first pixel electrode is electrically connected, and the second pixel electrode is arranged uniformly in the pixel, among the plurality of pixels, that overlaps the fourth light shielding portion that covers the fourth junction region of the first element portion to which the second pixel electrode is electrically connected.

Thus, because the first pixel electrode and the second pixel electrode each partly overlap the second light shielding portion or the fourth light shielding portion that has a width that is larger in the second direction than the first and third light shielding portions in plan view on the substrate and do not overlap the first light shielding portion or the third light shielding portion, the area of portions at which the first pixel electrode overlaps the light shielding portions and the area of portions at which the second pixel electrode overlaps the light shielding portions may be made substantially or completely the same. Thus, for example, it is possible to substantially or completely eliminate a difference between the parasitic capacitance, formed between the first data line that is electrically connected to the first element portion and the first pixel electrode, and the parasitic capacitance, formed between the first data line and the second pixel electrode and, hence, the electric potential holding characteristic in the first pixel electrode and the electric potential holding characteristic in the second pixel electrode may be made substantially or completely the same. Thus, it is possible to substantially or completely uniform the display characteristic of the pixel in which the first pixel electrode is provided and the display characteristic of the pixel in which the second pixel electrode is provided.

In addition, particularly, in the aspect of the invention, the third pixel electrode is arranged, among the plurality of pixels, in any one of the pixels in which the sixth light shielding portion is formed and which are located adjacent to each other along the second direction, and the fourth pixel electrode is arranged, among the plurality of pixels, in any one of the pixels in which the eighth light shielding portion is formed and which are located adjacent to each other along the second direction. That is, the third pixel electrode and the fourth pixel electrode that are electrically connected to the second element portion are provided, among the plurality of pixel electrodes, as the pixel electrodes that respectively overlap the sixth light shielding portion and the eighth light shielding portion that respectively cover the sixth junction region and the eighth junction region of the second element portion as viewed in plan on the substrate. That is, as in the case of the positional relationship between the first and second pixel electrodes and the first to fourth light shielding portions, the third pixel electrode and the fourth pixel electrode each partly overlap the sixth light shielding portion or the eighth light shielding portion and do not overlap the fifth light shielding portion or the seventh light shielding portion, as viewed in plan on the substrate. Thus, it is possible to substantially or completely uniform the display characteristic of the pixel in which the third pixel electrode is provided and the display characteristic of the pixel in which the fourth pixel electrode is provided.

Furthermore, the widths in the second direction of the second light shielding portion, the fourth light shielding portion, the sixth light shielding portion and the eighth light shielding portion are made substantially or completely the same, and the widths in the second direction of the first light shielding portion, the third light shielding portion, the fifth light shielding portion and the seventh light shielding portion are made substantially or completely the same. Thus, the display characteristics of the pixels provided in the first to fourth pixel electrodes may be further reliably made substantially or completely the same. That is, it is possible to substantially or completely uniform the display characteristics of the pixels that constitute the display area. As a result, it is possible to improve the quality of a display image.

An aspect of the invention provides a second electro-optical device that is provided with the third or fourth electro-optical device substrate (including its various specific aspects) according to the above described aspect of the invention.

With the second electro-optical device according to the aspect of the invention, because the first or second electro-optical device substrate according to the above described aspect of the invention is provided, it is possible to perform high-quality image display.

An aspect of the invention provides a second electronic apparatus that is provided with the second electro-optical device (including its various specific aspects) according to the above described aspect of the invention.

According to the second electronic apparatus of the aspect of the invention, because it is provided with the above described second electro-optical device according to the invention, it is possible to realize various electronic apparatuses that are able to perform high-quality image display, such as a projection display device, a television, a cellular phone, a personal organizer, a word processor, a viewfinder type or a direct view type video tape recorder, a workstation, a video telephone, a point-of-sales terminal, or a touch panel. In addition, as the second electronic apparatus according to the aspect of the invention, it is possible to, for example, realize an electrophoretic device, or the like, such as an electronic paper, an electron emission device, and a display device that uses the electrophoretic device or the electron emission device.

The function and other advantages of the aspects of the invention will become apparent from the embodiments described below.

BRIEF DESCRIPTION OF THE DRAWINGS

The invention will be described with reference to the accompanying drawings, wherein like numbers reference like elements.

FIG. 1 is a plan view of the general configuration of a liquid crystal device according to a first embodiment.

FIG. 2 is a cross-sectional view that is taken along the line II-II in FIG. 1.

DESCRIPTION OF EXEMPLARY EMBODIMENTS

Figure 3:
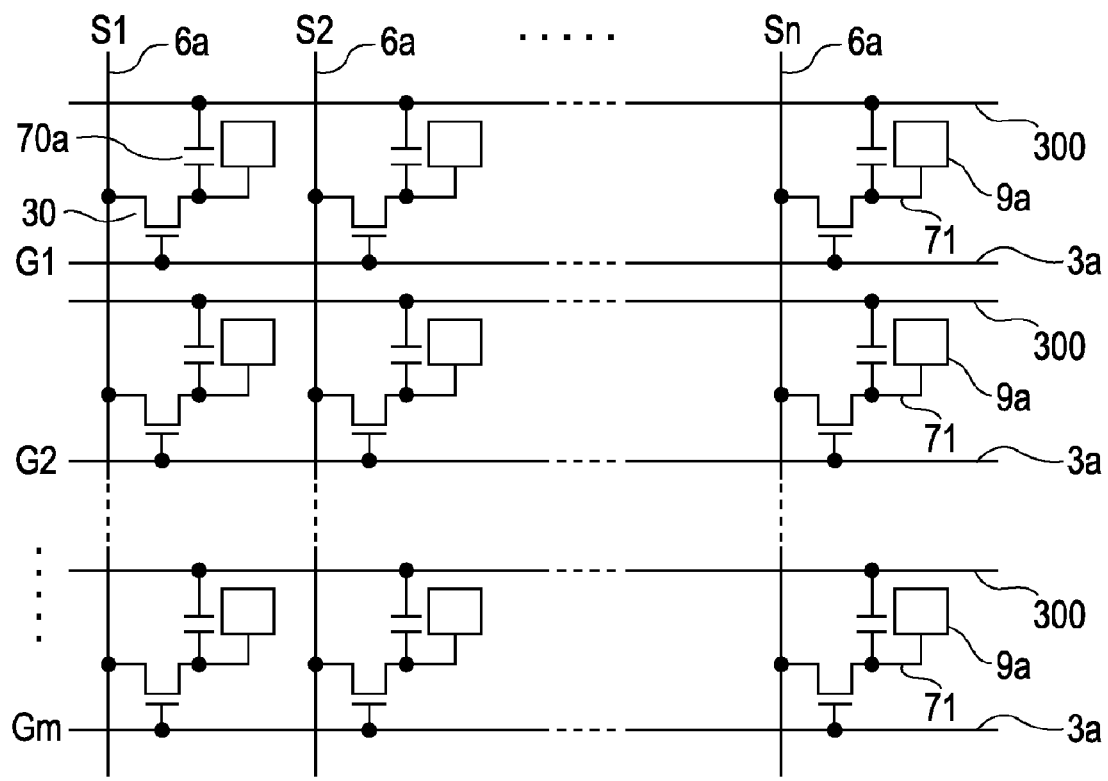
FIG. 3 is an equivalent circuit diagram of a plurality of pixel portions of the liquid crystal device according to the first embodiment.
Figure 3:
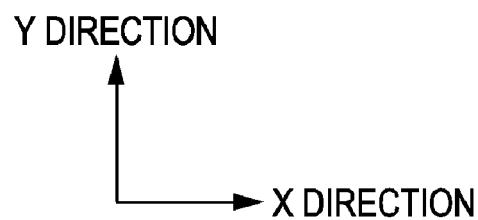

An embodiment of the invention will be described with reference to the accompanying drawings. In the following embodiments, a TFT active matrix addressing liquid crystal device, which has an installed driving circuit, is used as one example of an electro-optical device according to the aspects of the invention.

First Embodiment

A liquid crystal device according to a first embodiment will be described with reference to FIG. 1 to FIG. 13.

First, the general configuration of the liquid crystal device according to the present embodiment will be described with reference to FIG. 1 and FIG. 2.

FIG. 1 is a plan view of the liquid crystal device, showing a TFT array substrate together with various components formed thereon, as viewed from the side of an opposite substrate. FIG. 2 is a cross-sectional view that is taken along the line II-II in FIG. 1.

As shown in FIG. 1 and FIG. 2, in the liquid crystal device according to the present embodiment, a TFT array substrate 10 and an opposite substrate 20 are opposed to each other. A liquid crystal layer 50 is sealed between the TFT array substrate 10 and the opposite substrate 20. The TFT array substrate 10 and the opposite substrate 20 are adhered to each other by a seal material 52, which is provided in a seal region located around an image display area 10a, which is one example of a "display area" and in which a plurality of pixel portions are provided, according to the aspects of the invention.

The seal material 52 is, for example, formed of an ultraviolet curing resin, a thermoset resin, or the like, for adhering both substrates. The seal material 52, after being applied on the TFT array substrate 10 in a manufacturing process, is hardened by ultraviolet irradiation, heating, or the like. In the seal material 52, gap materials 56, such as glass fibers or glass beads, are dispersed in order to form a gap (that is, inter-substrate gap), having a predetermined value, between the TFT array substrate 10 and the opposite substrate 20. The liquid crystal device according to the present embodiment is suitable for performing enlarged display with a small size used for a light valve of a projector.

In parallel to the inside of the seal region in which the seal material 52 is arranged, a window-frame-shaped light shielding film 53, having a light shielding property, that defines a window frame region of the image display area 10a is provided on the side of the opposite substrate 20. However, part or all of the window-frame-shaped light shielding film 53 may be provided on the side of the TFT array substrate 10 as an internal light shielding film.

Within a peripheral region, in a region located on the outer side of the seal region in which the seal material 52 is arranged, the data line driving circuit 101 and the external circuit connecting terminal 102 are provided along one side of the TFT array substrate 10. The scanning line driving circuits 104 are provided along two sides, adjacent to the one side so as to be covered with the window-frame-shaped light shielding film 53. Moreover, in order to connect the two scanning line driving circuits 104 provided on both sides of the image display area 10a, a plurality of wirings 105 are provided along the remaining one side of the TFT array substrate 10 so as to be covered with the window-frame-shaped light shielding film 53.

Conductive materials 106, which serve as conductive terminals provided between both the substrates, are arranged at four corner portions of the opposite substrate 20. On the other hand, on the TFT array substrate 10, conductive terminals are provided at portions corresponding to these corner portions. In this manner, electrical conduction is established between the TFT array substrate 10 with the opposite substrate 20.

As shown in FIG. 2, an alignment layer is formed on pixel electrodes 9a, for which pixel switching TFTs and wirings, such as scanning lines and data lines, have been formed, on the TFT array substrate 10. On the other hand, on the opposite substrate 20, in addition to an opposite electrode 21, a light shielding film 23, which is formed in a grid or in a stripe, is formed, and an alignment layer is further formed in an uppermost layer. The liquid crystal layer 50 is, for example, formed of liquid crystal that is mixed with a single or multiple types of nematic liquid crystal. The liquid crystal layer 50 is made into a predetermined aligned state between a pair of these alignment layers.

The TFT array substrate 10 is a transparent substrate, such as a quartz substrate, a glass substrate, or a silicon substrate, for example. As in the case of the TFT array substrate 10, the opposite substrate 20 is also a transparent substrate.

The pixel electrodes 9a are provided on the TFT array substrate 10, and an alignment layer, on which a predetermined alignment process, such as rubbing process, has been performed, is provided on the upper side of the pixel electrodes 9a. For example, each of the pixel electrodes 9a is formed of a transparent conductive film, such as an ITO film. The alignment layer is formed of an organic film, such as a polyimide film.

The opposite electrode 21 is provided substantially all over the entire surface of the opposite substrate 20, and an alignment layer 22, on which a predetermined alignment process, such as rubbing process, has been performed, is provided on a lower side of the opposite electrode 21. The opposite electrode 21 is, for example, formed of a transparent conductive film, such as an ITO film. The alignment layer 22 is formed of an organic film, such as a polyimide film.

A light shielding film, which is formed in a grid or in a stripe, may be provided on the opposite substrate 20. With this configuration, together with an upper light shielding film provided as an upper capacitor electrode 300, which will be described later, it is possible to reliably block incident light that will enter from the side of the TFT array substrate 10 to a channel region and its peripheral region.

As the thus configured, the liquid crystal layer 50 is formed between the TFT array substrate 10 and the opposite substrate 20, which are provided so that the pixel electrodes 9a and the opposite electrode 21 are opposed to each other. The liquid crystal layer 50 is made into a predetermined aligned state by the alignment layers in a state where no electric field is applied from the pixel electrodes 9a.

Note that, in addition to these driving circuits, such as the data line driving circuit 101 and the scanning line driving circuits 104, a sampling circuit that samples an image signal on an image signal line and then supplies the data line with the sampled image signal, a pre-charge circuit that separately supplies pre-charge signals of predetermined voltage levels to the plurality of data lines in advance of image signals, a check circuit for checking quality, defects, or the like, of the electro-optical device during manufacturing or upon shipment, or the like, may be formed on the TFT array substrate 10 shown in FIG. 1 and FIG. 2.

The configuration of electrical connection of the pixel portions of the liquid crystal device according to the present embodiment will be described with reference to FIG. 3.

FIG. 3 is an equivalent circuit diagram of various elements, wirings, and the like, in a plurality of pixels that are formed in a matrix and that constitute an image display area of the liquid crystal device according to the present embodiment.

In FIG. 3, both the pixel electrode 9a and the TFT 30 are formed in each of the plurality of pixels, which are formed in a matrix and constitute the image display area 10a. Each of the TFTs 30 is electrically connected to a corresponding one of the pixel electrodes 9a, and controls switching of the pixel electrode 9a while the liquid crystal device is operating. Each of the data lines 6a, which are supplied with image signals, is electrically connected to the source of the corresponding TFT 30. The image signals S1, S2, . . . , Sn to be written to the data lines 6a may be supplied in line sequential in this order or may be supplied to the plurality of adjacent data lines 6a in units of group.

Each of the scanning lines 3a is electrically connected to the gate of the corresponding TFT 30. The liquid crystal device according to the present embodiment is configured to apply scanning signals G1, G2, . . . , Gm in line sequential in this order at predetermined timing to the scanning lines 3a in the form of pulse. Each of the pixel electrodes 9a is electrically connected to the drain of the corresponding TFT 30. By turning off the TFT 30, which serves as a switching element, only during a certain period, the image signals S1, S2, . . . , Sn supplied from the data lines 6a are written to the corresponding pixel electrodes 9a at predetermined timing. The image signals S1, S2, . . . , Sn of predetermined levels, written through the pixel electrodes 9a to the liquid crystal, which is one example of an electro-optical material, are held between the pixel electrodes 9a and the opposite electrode 21, which is formed on the opposite substrate 20, during a certain period of time.

The liquid crystal that constitutes the liquid crystal layer 50 modulates light to enable gray shade as alignment and/or order of molecular association is changed by an applied voltage level. In the case of a normally white mode, a transmittance ratio to incident light is reduced in accordance with a voltage applied in units of pixel. In the case of a normally black mode, a transmittance ratio to incident light is increased in accordance with a voltage applied in units of pixel. As a whole, light having a contrast corresponding to image signals is emitted from the liquid crystal device. Here, in order to prevent the leakage of image signals being held, storage capacitors 70 are electrically connected in parallel with the liquid crystal capacitors that are formed between the corresponding pixel electrodes 9a and the opposite electrode 21. Each of the storage capacitors 70 is a capacitive element that functions as a holding capacitor that temporarily holds an electric potential of the corresponding pixel electrode 9a in accordance with supply of an image signal. Owing to the storage capacitor 70, electric potential holding characteristic is improved in the pixel electrode 9a, and it is possible to improve contrast and to improve display characteristics, such as a reduction in flicker.

Next, the specific configuration of the pixel portions that implement the above operation will be described with reference to FIG. 4 to FIG. 6.

Figure 4:
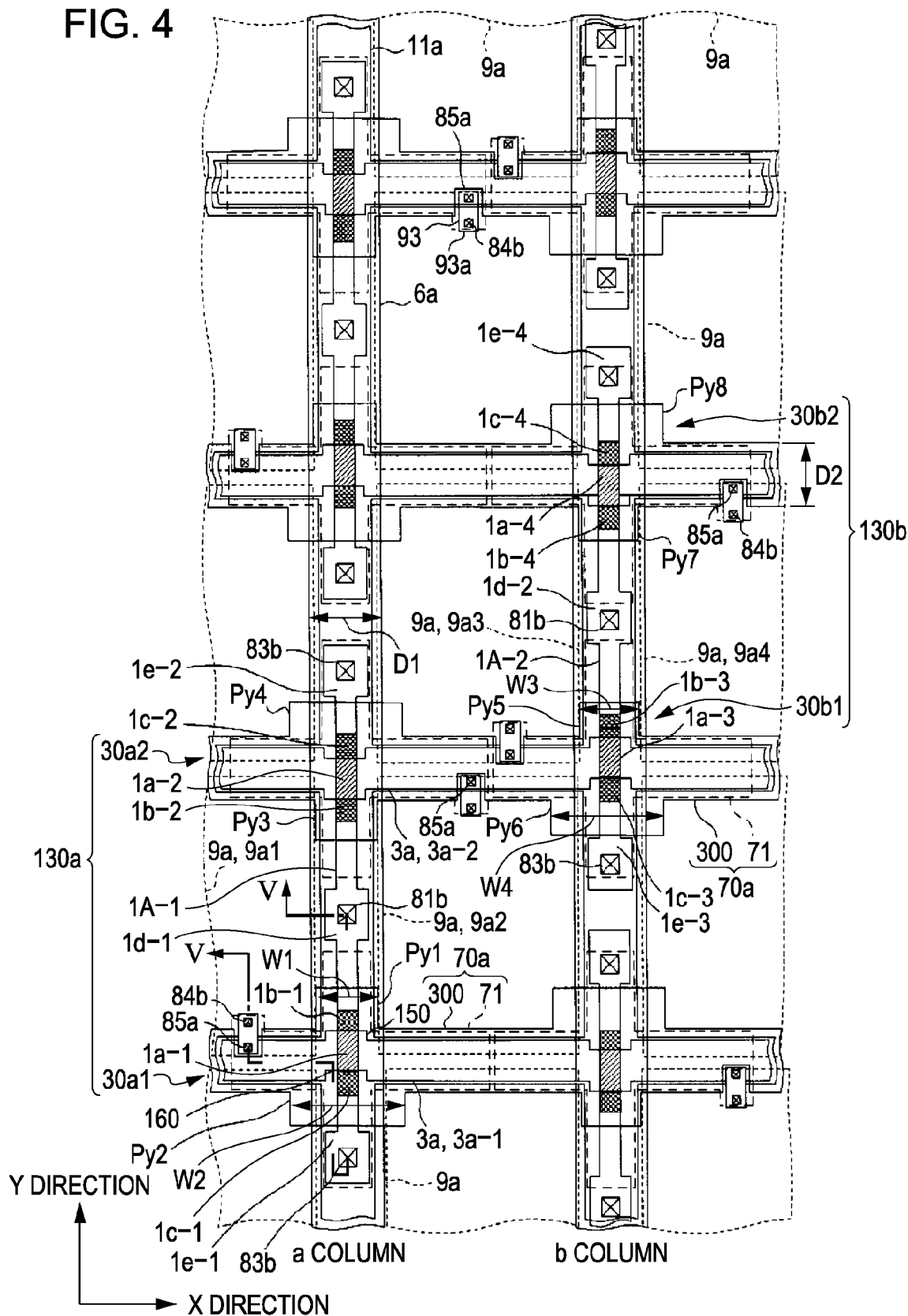
FIG. 4 is a plan view of a plurality of pixel portions of the liquid crystal device according to the first embodiment.

FIG. 4 is a plan view of a plurality of adjacent pixel portions. FIG. 5 is a cross-sectional view that is taken along the line V-V in FIG. 4. FIG. 6 is a plan view of an element portion that is formed so as to include two transistor elements. Note that, in FIG. 4 to FIG. 6, in order to make it easier to recognize the layers and components in the drawings, the dimensions and ratios of the components are appropriately varied. In FIG. 4 and FIG. 5, for easier description, portions located on or above the pixel electrodes 9a are not shown in these drawings. In FIG. 5, the portions from the TFT array substrate 10 to the pixel electrodes 9a constitute one example of an "electro-optical device substrate" according to the aspects of the invention.

Figure 5:
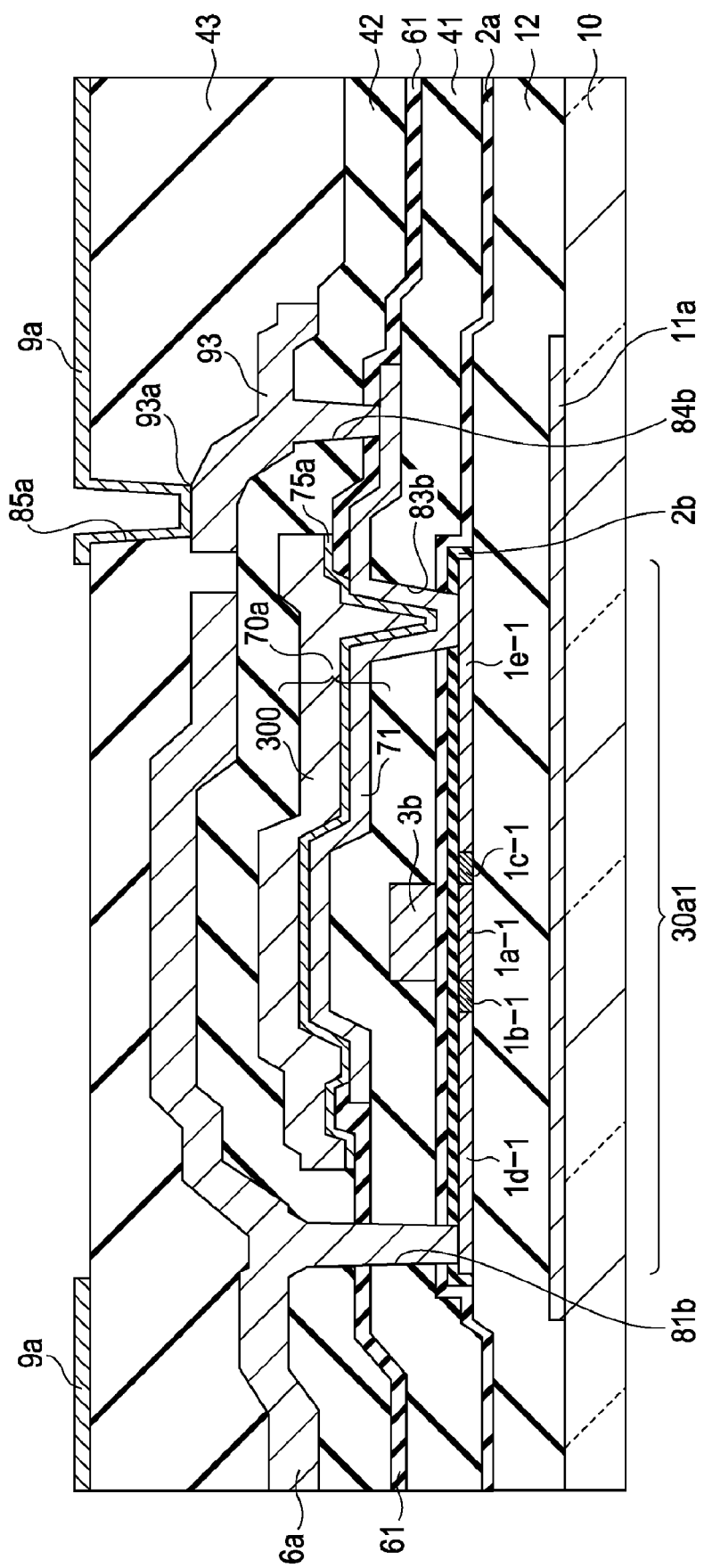
FIG. 5 is a cross-sectional view that is taken along the line V-V in FIG. 4.

As shown in FIG. 4 and FIG. 5, the liquid crystal device according to the present embodiment includes the TFT array substrate 10, the plurality of data lines 6a and the plurality of scanning lines 3a, both of which are formed on the TFT array substrate 10, the plurality of pixel electrodes 9a, element portions 130a, each of which is an example of "first element portion" according to the aspects of the invention, element portions 130b, each of which is an example of "second element portion" according to the aspects of the invention, and storage capacitors 70a.

The image display area 10a on the TFT array substrate 10 is formed of the plurality of pixels for which the pixel electrodes 9a are respectively provided. On the TFT array substrate 10, the data lines 6a and the scanning lines 3a are respectively provided along vertical and horizontal boundaries between the plurality of pixel electrodes 9a that are arranged in a matrix. The scanning lines 3a extend along an X direction, and the data lines 6a extend along a Y direction so as to intersect the scanning lines 3a. The pixel switching TFTs 30 are provided at positions at which the scanning lines 3a and the data lines 6a intersect with each other. Each of the pixel switching TFTs 30 is formed as part of the element portion 130a or 130b, each of which is formed of a set of two TFTs 30 that are arranged along the Y direction in which the data line 6a extends.

The scanning lines 11, the data lines 6a, the storage capacitors 70a, lower side light shielding films 11a, and relay layers 93 are arranged in a non-aperture region on the TFT array substrate 10, which surrounds aperture regions of the pixels (that is, regions of the pixels, in which light is transmitted or reflected to contribute to actual display) corresponding to the pixel electrodes 9a, as viewed in plan. That is, these scanning lines 3a, storage capacitors 70a, data lines 6a and lower side light shielding films 11a are arranged not in the aperture regions of the pixels but in the non-aperture region so as not to hinder display.

Each of the element portions 130a includes a pair of TFT 30a1 and TFT 30a2. Each of the element portions 130a is formed in a region that extends along the Y direction in which the data line 6a extends, within the non-aperture region that separates the aperture regions of the plurality of pixels on the TFT array substrate 10. More specifically, each of the element portions 130a is formed in a region in which a-th column data line 6a is formed, among the plurality of data lines 6a formed in the X direction, so that the channel lengths of the TFTs 30a1 and 30a2 included in the element portion 130a are placed along the Y direction. In addition, the plurality of element portions 130a are arranged along the Y direction in the region in which the a-th data line 6a is formed.

Each of the element portions 130b, as in the case of the element portions 130a, includes a pair of TFTs 30b1 and 30b2, and the plurality of element portions 130b are arranged along the Y direction in a region in which b-th column data line 6a is formed. The element portions 130a and 130b are arranged offset by one pixel along the Y direction to each other.

Here, the a-th column and the b-th column are located adjacent to each other at a space of one pixel. For example, when the a-th column is i-th column (i is natural number), the b-th column is (i+1)th column. In the present embodiment, for easier description, the columns located adjacent to each other are termed as a column and b column. Hereinafter, among the plurality of element portions, the element portions 130a and 130b that correspond to each other will be specifically described.

Next, the specific configuration of the element portion 130a will be described with reference to FIG. 4 to FIG. 6.

Figure 6:
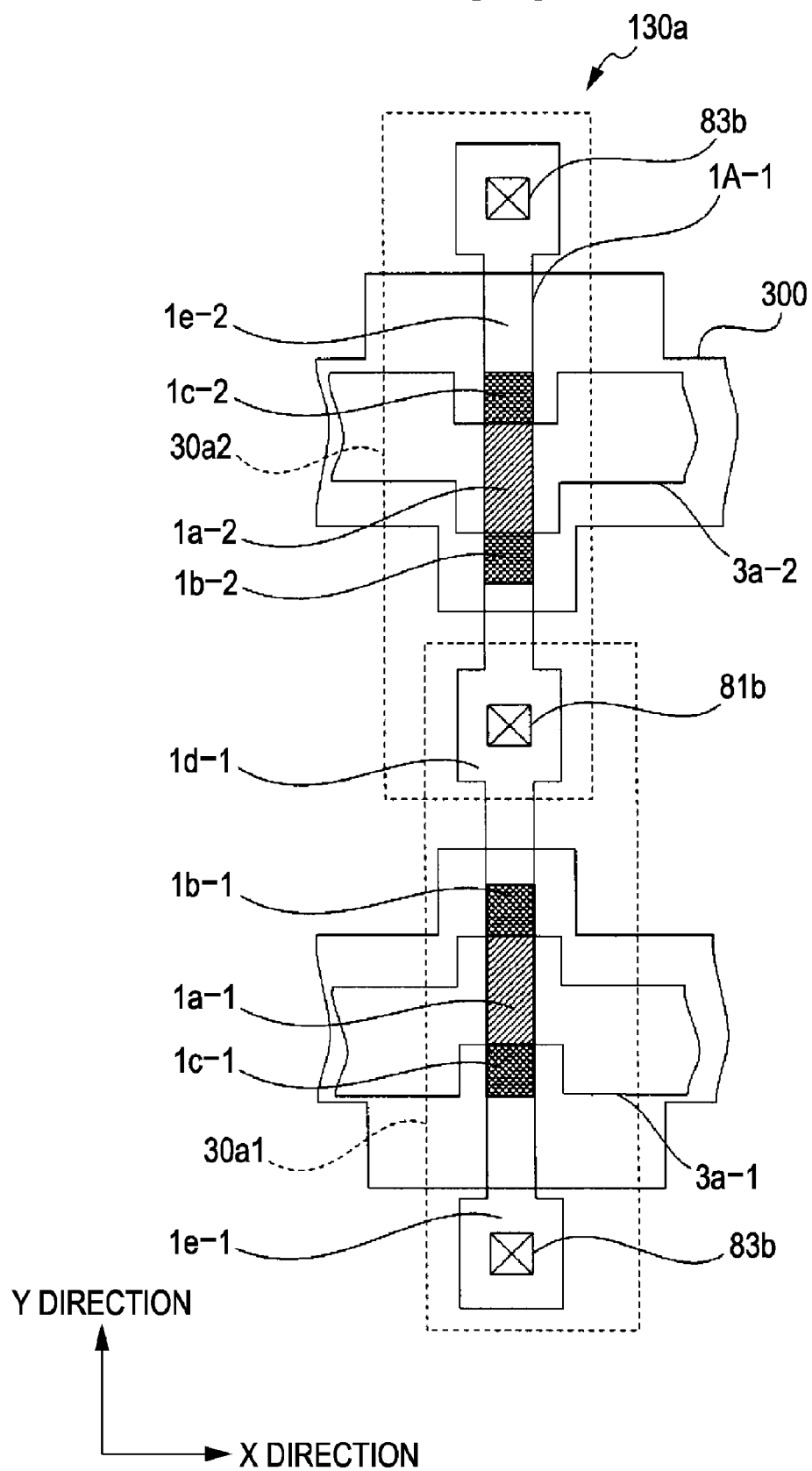
FIG. 6 is a plan view of an element portion of the liquid crystal device according to the first embodiment.

As shown in FIG. 4 to FIG. 6, the element portion 130a has a first semiconductor layer 1A-1 that includes a first data line side source/drain region 1d-1, a first channel region 1a-1, a second channel region 1a-2, a first pixel electrode side source/drain region 1e-1, a second pixel electrode side source/drain region 1e-2, a data line side LDD region 1b-1, a pixel electrode side LDD region 1c-1, a data line side LDD region 1b-2, and a pixel electrode side LDD region 1c-2. The first data line side source/drain region 1d-1 is electrically connected to the a column data line 6a. The first channel region 1a-1 and the second channel region 1a-2 are located on both sides of the first data line side source/drain region 1d-1 along the Y direction. The first pixel electrode side source/drain region 1e-1 and the second pixel electrode side source/drain region 1e-2 are respectively located on the outer side of the first channel region 1a-1 and on the outer side of the second channel region 1a-2 along the Y direction as viewed from the first data line side source/drain region 1d-1 and are electrically connected respectively to the first pixel electrode 9a1 and the second pixel electrode 9a2 that are different from each other among the plurality of pixel electrodes 9a. The data line side LDD region 1b-1, which is an example of "first junction region" according to the aspects of the invention, is formed between the first channel region 1a-1 and the first data line side source/drain region 1d-1. The pixel electrode side LDD region 1c-1, which is an example of "second junction region" according to the aspects of the invention, is formed between the first channel region 1a-1 and the first pixel electrode side source/drain region 1e-1. The data line side LDD region 1b-2, which is an example of "third junction region" according to the aspects of the invention, is formed between the second channel region 1a-2 and the first data line side source/drain region 1d-1. The pixel electrode side LDD region 1c-2, which is an example of "fourth junction region" according to the aspects of the invention, is formed between the second channel region 1a-2 and the second pixel electrode side source drain region 1e-2.

The TFT 30a1 is formed so as to include the first channel region 1a-1, the data line side LDD region 1b-1, the pixel electrode side LDD region 1c-1, the first data line side source/drain region 1d-1, the first pixel electrode side source/drain region 1e-1, and part of the scanning line 3a-1 that overlaps the first channel region 1a-1 as a gate line. The first semiconductor layer 1A-1 is, for example, formed of polysilicon. The first semiconductor layer 1A-1 includes the first channel region 1a-1, the data line side LDD region 1b-1 and the pixel electrode side LDD region 1c-1, each of which has a channel length along the Y direction, and further includes the first data line side source/drain region 1d-1 and the first pixel electrode side source/drain region 1e-1. That is, the TFT 30a1 has an LDD structure.

The first data line side source/drain region 1d-1 and the first pixel electrode side source/drain region 1e-1 are formed substantially in mirror symmetry along the Y direction with respect to the first channel region 1a-1. The data line side LDD region 1b-1, the pixel electrode side LDD region 1c-1, the first data line side source/drain region 1d-1 and the first pixel electrode side source/drain region 1e-1 are impurity regions that are formed by implanting impurities into the first semiconductor layer 1a-1 by means of impurity implantation, such as ion implantation, for example. The data line side LDD region 1b-1 and the pixel electrode side LDD region 1c-1 are formed as lightly-doped impurity regions that respectively contain smaller impurities than the first data line side source/drain region 1d-1 and the first pixel electrode side source/drain region 1e-1. According to the above impurity regions, while the TFT 30a1 is not operating, it is possible to reduce an off electric current that flows through the source region and the drain region and also possible to suppress a decrease in on electric current that flows while the TFT 30a1 is operating. Note that the TFT 30a1 preferably has an LDD structure; however, the TFT 30a1 may have an offset structure in which impurities are not implanted in the data line side LDD region 1b-1 and the pixel electrode side LDD region 1c-1, or may have a self-aligned structure in which the data line side source/drain region and the pixel electrode side source/drain region are formed by densely implanting impurities using the gate electrode as a mask.

The TFT 30a2 is formed on the opposite side to the TFT 30a1 along the Y direction with respect to the first data line side source/drain region 1d-1, and shares the first semiconductor layer 1A-1 with the TFT 30a1. The TFT 30a2 is formed so as to include the first data line side source/drain region 1d-1, the second channel region 1a-2, the data line side LDD region 1b-2, the pixel electrode side LDD region 1c-2, the second pixel electrode side source/drain region 1e-2, and part of the scanning line 3a-2 that overlaps the second channel region 1a-2 as a gate line. The TFT 30a2 has an element structure that is substantially in mirror symmetry with the TFT 30a1 with respect to the first data line side source/drain region 1d-1.

As shown in FIG. 4, the TFT 30a1 and 30a2 are formed so that the first pixel electrode side source/drain region 1e-1 and the second pixel electrode side source/drain region 1e-2 are reversed in orientation with respect to the first data line side source/drain region 1d-1 along the Y direction, and share a contact hole 81b that electrically connects the first data line side source/drain region 1d-1 to the data line 6a.

That is, as shown in FIG. 4, in the Y direction, which is a vertical direction in the drawing, the pair of TFTs 30a1 and 30a2 are TFTs that are located in vertically inverted positions or in vertically mirror-inverted positions. Then, the element portion 130a having a pair of TFTs that are arranged in mirror symmetry with each other as described above is electrically connected to the data line 6a through the single contact hole 81b only. That is, in comparison with the case where, as in the normal structure, the TFT 30a1 and the TFT 30a2 are separately provided for each pixel and are electrically connected from separate data line side source/drain regions to the data line 6a, the number of contact holes may be reduced significantly. In this manner, it is possible to reduce a pitch at which the pixel portions are arranged and also possible to realize a reduction in size and high resolution of the liquid crystal device.

As shown in FIG. 5, in the TFT 30a1, the first data line side source/drain region 1d-1 is electrically connected to the data line 6a through the contact hole 81b, which is formed to extend through an interlayer insulating film 42, an insulating film 61, an interlayer insulating film 41 and a gate insulating film 2 (specifically, insulating films 2a and 2b). The first pixel electrode side source/drain region 1e-1 is electrically connected to a lower capacitor electrode 71, which will be described later, through a contact hole 83b, which is formed to extend through the interlayer insulating film 41 and the gate insulating film 2.

Note that, in the TFT 30a2 as well, like the TFT 30a1, the second pixel electrode side source/drain region 1e-2 is electrically connected to the lower capacitor electrode 71 that corresponds to the TFT 30a2 through the contact hole 83b, which is formed to extend through the interlayer insulating film 41 and the gate insulating film 2.

As shown in FIG. 4 to FIG. 6, each of the gate electrodes of the TFTs 30a1 and 30a2 is formed as part of the scanning line 3a, and is, for example, formed of conductive polysilicon. More specifically, parts of the scanning lines 3a1 and 3a2, which respectively overlap the first channel region 1a-1 and the second channel region 1a-2, constitute the gate electrodes of the TFTs.

The scanning line 3a1 includes a main line portion that extends along the X direction and a portion, which is defined by a projection 150 that projects along the Y direction and a recess 160 that is recessed along the Y direction and which overlaps the first channel region 1a-1 of the TFT 30a1 to thereby function as a gate electrode. The gate electrode is insulated from the first semiconductor layer 1A-1 by the gate insulating film 2 (more specifically, two-layer insulating films 2a and 2b). The scanning line 3a2, as well as the scanning line 3a1, is formed so that part of the main line portion extending in the X direction, defined by the projection and the recess, overlaps the second channel region 1a-2 to thereby function as a gate electrode.

The lower side light shielding film 11a, which are provided in a grid on the lower side of the TFTs 30a1 and 30a2 via the base insulating film 12, shields the channel regions of the TFTs 30a1 and 30a2 and their peripheral portions against return light that will enter the device from the side of the TFT array substrate 10. The lower side light shielding film 11a is, for example, formed of metal element substance, alloy, metal silicide, or polysilicide, which contains at least one of high-melting point metals, such as Ti, Cr, W, Ta, Mo or Pd, or a laminated structure of them.

The base insulating film 12 not only has a function to insulate the TFTs 30a1 and 30a2 from the lower side light shielding film 11a but also has a function to prevent the surface of the TFT array substrate 10 from being rough while polishing and a function to prevent the characteristics of the pixel switching TFT 30 from being degraded because of dirt that is left after washing, or the like, by forming the base insulating layer 12 all over the TFT array substrate 10. Note that the pair of TFTs included in the element portion 130b are also shielded by the light shielding film 11a and insulated by the base insulating film 12.

As shown in FIG. 4 and FIG. 5, the storage capacitor 70a is provided in an upper layer side than the TFT 30a1 on the TFT array substrate 10 through the interlayer insulating film 41. Each storage capacitor 70a is formed so that the lower capacitor electrode 71 and an upper capacitor electrode 300 are opposed to each other through a dielectric film 75a. The storage capacitor 70a that is formed in correspondence with the TFT 30a1 is an example of "first capacitive element" according to the aspects of the invention, and the storage capacitor 70a that is provided in correspondence with the TFT 30a2 is an example of "second capacitive element" according to the aspects of the invention. In addition, the storage capacitor 70a that is formed in correspondence with the TFT 30b1, which will be described later, is an example of "third capacitive element" according to the aspects of the invention, and the storage capacitor 70a that is provided in correspondence with the TFT 30b2, which will be described later, is an example of "fourth capacitive element" according to the aspects of the invention.

The upper capacitor electrode 300 is a fixed electric potential side capacitor electrode. The lower capacitor electrode 71 is a pixel electric potential side capacitor electrode that is electrically connected to the first pixel electrode side source/drain region 1e-1 of the TFT 30a1 through the contact hole 83b. The lower capacitor electrode 71 is formed of a semiconductor, such as polysilicon. Thus, the storage capacitor 70a has a so-called MIS structure in which a lamination of metal-dielectric-metal is formed. The lower capacitor electrode 71 is electrically connected to the relay layer 93 through a contact hole 84b, which is formed to extend through the interlayer insulating film 42 and the insulating film 61. Note that the lower capacitor electrode 71 not only functions as the pixel electric potential side capacitor electrode but also functions as a light absorption layer or a light shielding film arranged between the TFT 30a1 and the upper capacitor electrode 300, which serves as an upper side light shielding film. The data line 6a is electrically connected to the first data line side source/drain region 1d-1 through the contact hole 81b that extends through the interlayer insulating film 41, the insulating film 61 and the interlayer insulating film 42.

The lower capacitor electrode 71 is electrically connected to the relay layer 93 through the contact hole 84b and, together with the relay layer 93, relays electrical connection between the first pixel electrode side source/drain region 1e-1 and the pixel electrode 9a. In addition, the relay layer 93 is electrically connected to the pixel electrode 9a through a projecting portion 93a, which is part of the relay layer 93, and a contact hole 85a that is electrically connected to the projecting portion 93a. Thus, the pixel electrode 9a and the lower capacitor electrode 71 are electrically connected to each other.

The upper capacitor electrode 300 is an opaque metal film that contains, for example, metal or alloy, and is provided on the upper side of the TFT 30a1. The upper capacitor electrode 300 also functions as an upper side light shielding film (or internal light shielding film) that shields the TFT 30a1. The upper capacitor electrode 300 is formed to contain a metal, such as Al (aluminum) or Ag (silver).

Note that the upper capacitor electrode 300 may be, for example, formed of metal element substance, alloy, metal silicide, or polysilicide, which contains at least one of high-melting point metals, such as Ti, Cr, W, Ta, Mo, or Pd, or a laminated structure of them, as "conductive light shielding film" according to the aspects of the invention. In this case, it is possible to further improve the function of the upper capacitor electrode 300 as the upper side light shielding film.

The upper capacitor electrodes 300 extend from the image display area 10a, in which the pixel electrodes 9a are arranged, to the periphery of the image display area 10a. The lower capacitor electrode 71 is electrically connected to a constant electric potential source. The lower capacitor electrode 71 is a fixed electric potential side capacitor electrode that is maintained at a fixed electric potential.

The dielectric film 75a has a monolayer structure or a multilayer structure that is, for example, formed of a silicon oxide film, such as an HTO (High Temperature Oxide) film, an LTO (Low Temperature Oxide) film, or a silicon nitride film.

The insulating film 61 is partly interposed between the interlayer insulating films 41 and 42. Note that the lower capacitor electrode 71 may be formed of a metal film. According to the lower capacitor electrode 71 as described above, the storage capacitor 70a may have a so-called MIM structure in which a lamination of metal-dielectric-metal is formed.

As shown in FIG. 4, the lower capacitor electrodes 71 are spaced apart from one another pixel by pixel. Thus, an image signal supplied through the corresponding data line 6a is supplied to the first pixel electrode 9a1 corresponding to the TFT 30a1 in accordance with a switching operation of the TFT 30a1. Each of the upper capacitor electrodes 300 extends along the X direction over the plurality of pixels and therefore shared by the plurality of pixels, so that the area of the electrode is larger than that of the lower capacitor electrode 71. However, the upper capacitor electrode 300 is formed of a metal film, such as Al, so that it is possible to suppress an increase in electrical resistance due to an increase in area of the electrode in comparison with the case where the upper capacitor electrode 300 is formed of a semiconductor. Thus, it is possible to reduce power consumption when the liquid crystal device is operating and also possible to drive various elements in each pixel at high speed. Hence, it is advantageous in that it is possible to suppress a decrease in response when an image is displayed by the liquid crystal device.

Note that the above advantage is not limited to the case where the upper capacitor electrode 300 is formed so as to extend along the X direction over the pixels located adjacent to one another as in the present embodiment, but the advantage may be obtained when the upper capacitor electrode 300 is formed so as to extend over a plurality of pixels in order to occupy a larger area within the image display area 10a.

As shown in FIG. 4, the storage capacitor 70a includes a first portion Py1 and a second portion Py2. The first portion Py1 and the second portion Py2 extend along the Y direction from an intersection region in which a first region D1 extending in the Y direction intersects with a second region D2 extending in the X direction. The first portion Py1 is an example of "first light shielding portion" according to the aspects of the invention and covers the data line side LDD region 1b-1. The second portion Py2 is an example of "second light shielding portion" according to the aspects of the invention and covers the pixel electrode side LDD region 1c-1. The width W2 of the second portion Py2 in the X direction is larger than the width W1 of the first portion Py1.

Thus, with the second portion Py2, it is possible to more reliably block light that will enter the pixel electrode side LDD region 1c-1 than light that will enter the data line side LDD region 1b-1. That is, it is possible to improve or enhance the light shielding property to block light that will reach the pixel electrode side LDD region 1c-1 more than the light shielding property to block light that will reach the data line side LDD region 1b-1. The inventors of the present application estimate that, when the TFT 30a1 is operating, a light leakage current is more likely to be generated in the pixel electrode side LDD region 1c-1 than in the data line side LDD region 1b-1. That is, when the TFT 30a1 is operating, the inventors estimate that a light leakage current is more likely to be generated in the TFT 30a1 when light is irradiated to the pixel electrode side LDD region 1c-1 than when light is irradiated to the data line side LDD region 1b-1. Thus, when the second portion Py2 is formed to have a width W2 that is larger than the width W1 of the first portion Py1, it is possible to improve the light shielding property to the pixel electrode side LDD region 1c-1 at which a light leakage current is more likely to be generated and also possible to effectively reduce a light leakage current that flows through the TFT 30a1. Conversely, when the first portion Py1 that covers the data line side LDD region 1b-1, at which a light leakage current is less likely to be generated in comparison with the pixel electrode side LDD region 1c-1, is formed to have a width W1 that is smaller than the width of the second portion Py2, it is possible to prevent an unnecessary decrease in aperture ratio.

That is, the light shielding property to the pixel electrode side LDD region 1c-1, at which a light leakage current is more likely to be generated, is improved by forming the width W2 of the second portion Py2 larger, while it is possible to prevent an unnecessary decrease in aperture ratio by forming the width W1 of the first portion Py1 smaller. In other words, by improving the light shielding property only pinpoint to the pixel electrode side LDD region 1c-1 at which a light leakage current is likely to be generated, it is possible to effectively reduce display defects, such as flicker, that may occur because of a light leakage current generated in the TFT, without an unnecessary decrease in aperture ratio.

The storage capacitor 70a that overlaps the TFT 30a2 includes a third portion Py3 and a fourth portion Py4, as in the case of the first portion Py1 and the second portion Py2. The third portion Py3 and the fourth portion Py4 have widths that are different in the X direction from each other. The third portion Py3 is an example of "third light shielding portion" according to the aspects of the invention and covers the data line side LDD region 1b-2. The fourth portion Py4 is an example of "fourth light shielding portion" according to the aspects of the invention and covers the pixel electrode side LDD region 1c-2. The third portion Py3 is formed to have the same width as the width W1 of the first portion Py1, and the fourth portion Py4 is formed to have the same width as the width W2 of the second portion Py2. That is, the width of the fourth portion Py4 along the X direction is larger than the width of the third portion Py3 along the X direction. Thus, the third portion Py3 and the fourth portion Py4 effectively shield the data line side LDD region 1b-2 and the pixel electrode side LDD region 1c-2. However, in the TFT 30a2, in comparison with the TFT 30a1, the data line side LDD region 1b-2 and the pixel electrode side LDD region 1c-2 are formed at inverted positions with respect to the second channel region 1a-2. Thus, in the storage capacitor 70a that overlaps the TFT 30a2, the relative positional relationship between the third portion Py3 and the fourth portion Py4, which respectively correspond to the first portion Py1 and the second portion Py2, is inverted from the relative positional relationship between the first portion Py1 and the second portion Py2.

As shown in FIG. 4, the element portion 130b has a second semiconductor layer 1A-2 that includes a second data line side source/drain region 1d-2, a third channel region 1a-3, a fourth channel region 1a-4, a third pixel electrode side source/drain region 1e-3, a fourth pixel electrode side source/drain region 1e-4, a data line side LDD region 1b-3, a pixel electrode side LDD region 1c-3, a data line side LDD region 1b-4, and a pixel electrode side LDD region 1c-4. The second data line side source/drain region 1d-2 is electrically connected to the b column data line 6a. The third channel region 1a-3 and the fourth channel region 1a-4 are located on both sides of the second data line side source/drain region 1d-2 along the Y direction. The third pixel electrode side source/drain region 1e-3 and the fourth pixel electrode side source/drain region 1e-4 are respectively located on the outer side of the third channel region 1a-3 and on the outer side of the fourth channel region 1a-4 along the Y direction as viewed from the second data line side source/drain region 1d-2 and are electrically connected respectively to the third pixel electrode 9a3 and the fourth pixel electrode 9a4 that are different from each other among the plurality of pixel electrodes 9a. The data line side LDD region 1b-3, which is an example of "fifth junction region" according to the aspects of the invention, is formed between the third channel region 1a-3 and the second data line side source/drain region 1d-2. The pixel electrode side LDD region 1c-3, which is an example of "sixth junction region" according to the aspects of the invention, is formed between the third channel region 1a-3 and the third pixel electrode side source/drain region 1e-3. The data line side LDD region 1b-4, which is an example of "seventh junction region" according to the aspects of the invention, is formed between the fourth channel region 1a-4 and the second data line side source/drain region 1d-2. The pixel electrode side LDD region 1c-4, which is an example of "eighth junction region" according to the aspects of the invention, is formed between the fourth channel region 1a-4 and the fourth pixel electrode side source drain region 1e-4.

The element portion 130b has substantially the same structure as that of the element portion 130a, and includes a pair of TFTs 30b1 and 30b2 that respectively supply image signals to the pixels in which the third pixel electrode 9a3 and the fourth pixel electrode 9a4 are formed These pair of TFTs 30b1 and 30b2 correspond to the TFTs 30a1 and 30a2 formed in the element portion 130a, and respectively supply image signals to the third pixel electrode 9a3 and the fourth pixel electrode 9a4 through the third pixel electrode side source/drain region 1e-3 and the fourth pixel electrode side source/drain region 1e-4 that are electrically connected respectively to the third pixel electrode 9a3 and the fourth pixel electrode 9a4. Note that the image signals are supplied to the TFTs through the second data line side source/drain region 1d-2 that is shared by the pair of TFTs 30b1 and 30b2 included in the element portion 130b. With the element portion 130b, because the second data line side source/drain region 1d-2 is shared by the pair of TFTs, it is possible to reduce a pitch at which the pixels are arranged. However, as shown in FIG. 4, the element portion 130b is formed, among the plurality of data lines 6a, in a region in which the data line 6a corresponding to the b column is formed, and is arranged offset by one pixel to the upper side in the drawing along the Y direction relative to the element portion 130a.

The storage capacitor 70a that overlaps the TFT 30b1 included in the element portion 130b also includes a fifth portion Py5 and a sixth portion Py6 that have the same function as the first portion Py1 and the second portion Py2. The fifth portion Py5 is an example of "fifth light shielding portion" according to the aspects of the invention and covers the data line side LDD region 1b-3. The sixth portion Py6 is an example of "sixth light shielding portion" according to the aspects of the invention and covers the pixel electrode side LDD region 1c-3. More specifically, the width W6 of the sixth portion Py6 in the X direction is larger than the width W5 of the fifth portion Py5. Thus, in comparison with the data line side LDD region 1b-3, the pixel electrode side LDD region 1c-3 at which a light leakage current is likely to be generated is reliably shielded at a pinpoint.

In addition, the storage capacitor 70a that overlaps the TFT 30b2 includes a seventh portion Py7 and an eighth portion Py8 that have widths that are different in the X direction from each other, as in the case of the third portion Py3 and the fourth portion Py4. The seventh portion Py7 is an example of "seventh light shielding portion" according to the aspects of the invention and covers the data line side LDD region 1b-4. The eighth portion Py8 is an example of "eighth light shielding portion" according to the aspects of the invention and covers the pixel electrode side LDD region 1c-4. The seventh portion Py7 is formed to have the same width as the width W5 of the fifth portion Py5, and the eighth portion Py8 is formed to have the same width as the width W6 of the sixth portion Py6. That is, the width of the eighth portion Py8 along the X direction is larger than the width of the seventh portion Py7 along the X direction. Thus, the seventh portion Py7 and the eighth portion Py8 effectively shield the data line side LDD region 1b-4 and the pixel electrode side LDD region 1c-4, respectively. However, in the TFT 30b2, in comparison with the TFT 30b1, the data line side LDD region 1b-4 and the pixel electrode side LDD region 1c-4 are formed at inverted positions with respect to the fourth channel region 1a-4. Thus, in the storage capacitor 70a that overlaps the TFT 30b2, the relative positional relationship between the seventh portion Py7 and the eighth portion Py8, which respectively correspond to the fifth portion Py5 and the sixth portion Py6, is inverted from the relative positional relationship between the fifth portion Py5 and the sixth portion Py6.

Here, in the liquid crystal device according to the present embodiment, as described above, because the first portion Py1, the second portion Py2, the third portion Py3, the fourth portion Py4, the fifth portion Py5, the sixth portion Py6, the seventh portion Py7 and the eighth portion Py8 are provided, when the element portions 130a and 130b are merely arranged in the same row along the X direction, there will be a problem that a difference in aperture ratio occurs in the pixels that are located adjacent to each other in the X direction.

In terms of this problem, a further detailed description will be made with reference to a first comparative embodiment shown in FIG. 7.

Figure 7:
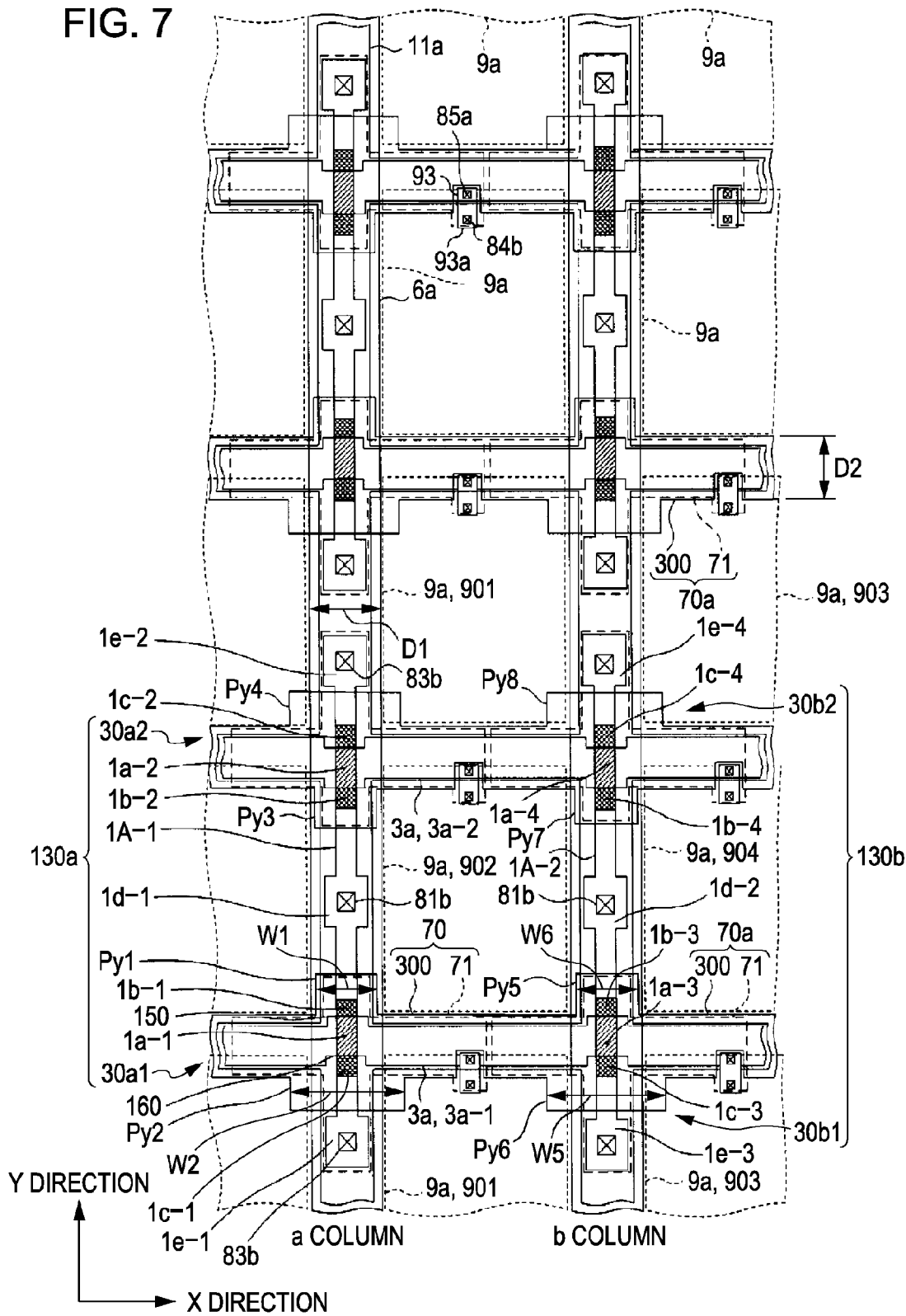
FIG. 7 is a plan view that corresponds to FIG. 4 according to a first comparative embodiment.

FIG. 7 is a plan view that corresponds to FIG. 4 according to the first comparative embodiment to the present embodiment. Note that, in FIG. 7, the same reference numerals are assigned to portions that are the same as those of the liquid crystal device according to the present embodiment shown in FIG. 4.

In the first comparative embodiment shown in FIG. 7, the element portion 130a and the element portion 130b are arranged in parallel with each other respectively in the a column and in the b column along the X direction in plan view. Each of the second portion Py2 and the sixth portion Py6 (or the fourth portion Py4 and the eighth portion Py8) extends into the aperture region of one pixel (that is, among the pixel electrodes 901 and 902 that are located adjacent to each other in the Y direction, the pixel in which the pixel electrode 901 is formed) among the two pixels that are located adjacent to each other in the Y direction. Each of the first portion Py1 and the fifth portion Py5 (or the third portion Py3 and the seventh portion Py7) extends into the aperture region of the other pixel (that is, among the pixel electrodes 901 and 902 that are located adjacent to each other in the Y direction, the pixel in which the pixel electrode 902 is formed) among the two pixels that are located adjacent to each other in the Y direction. Thus, the aperture ratio of the pixel in which the pixel electrode 901 is formed is reduced as compared with the aperture ratio of the pixel in which the pixel electrode 902 is formed. Because the plurality of element portions 130a and 130b are arranged in the Y direction, the aperture ratios of the plurality of pixels located between the a column and the b column along the Y direction are alternately different along the Y direction. In addition, between other adjacent columns as well, there will be a difference in aperture ratio in pixels that are located adjacent to each other along the Y direction, as in the case between the a column and the b column.

In this manner, because of a difference in width between the first portion Py1 and the second portion Py2, between the third portion Py3 and the fourth portion Py4, between the fifth portion Py5 and the sixth portion Py6, and between the seventh portion Py7 and the eighth portion Py8, which are provided to reduce a light leakage current generated in the TFTs, the aperture ratio of one of the adjacent pixels is smaller than that of the other pixel. In comparison with the case where there is no difference in width between the first portion Py1 and the second portion Py2, between the third portion Py3 and the fourth portion Py4, between the fifth portion Py5 and the sixth portion Py6, and between the seventh portion Py7 and the eighth portion Py8, display chrominance non-uniformity is produced over the entire image display area 10a along the Y direction and, hence, there is a possibility that the display performance of the liquid crystal device may be deteriorated.

Then, as shown in FIG. 4, in the liquid crystal device according to the present embodiment, the element portions 130a and 130b are arranged offset to each other by one pixel along the Y direction. According to the above arrangement, the first portion Py1, the second portion Py2, the third portion Py3, the fourth portion Py4, the fifth portion Py5, the sixth portion Py6, the seventh portion Py7 and the eighth portion Py8 are arranged offset to each other along the Y direction so as to cover the LDD region that should be shielded by each of the portions.

More specifically, among the two pixels that are located adjacent to each other along the Y direction, the second portion Py2 and the seventh portion Py7 (or the fourth portion Py4 and the fifth portion Py5) overlap one of the pixels, and the first portion Py1 and the eighth portion Py8 (or the third portion Py3 and the sixth portion Py6) overlap the other pixel. Thus, it is possible to uniform the aperture ratios of the plurality of pixels that constitute the image display area 10a.

In addition, because the liquid crystal device according to the present embodiment includes the second portion Py2, the fourth portion Py4, the sixth portion Py6 and the eighth portion Py8 that shield the LDD regions at which a light leakage current is likely to be generated at a pinpoint, a light leakage current generated in the pixel switching TFTs is reduced in comparison with the case where the second portion Py2, the fourth portion Py4, the sixth portion Py6 and the eighth portion Py8 are not provided. Furthermore, in the liquid crystal device according to the present embodiment, because the widths of the first portion Py1, the third portion Py3, the fifth portion Py5 and the seventh portion Py7 are reduced as compared with the widths of the second portion Py2, the fourth portion Py4, the sixth portion Py6 and the eighth portion Py8, the aperture ratio of each pixel is not extremely decreased.

Next, the aperture regions of the pixels of the liquid crystal device according to the present embodiment will be described with reference to FIG. 8 and FIG. 9.

Figure 8:
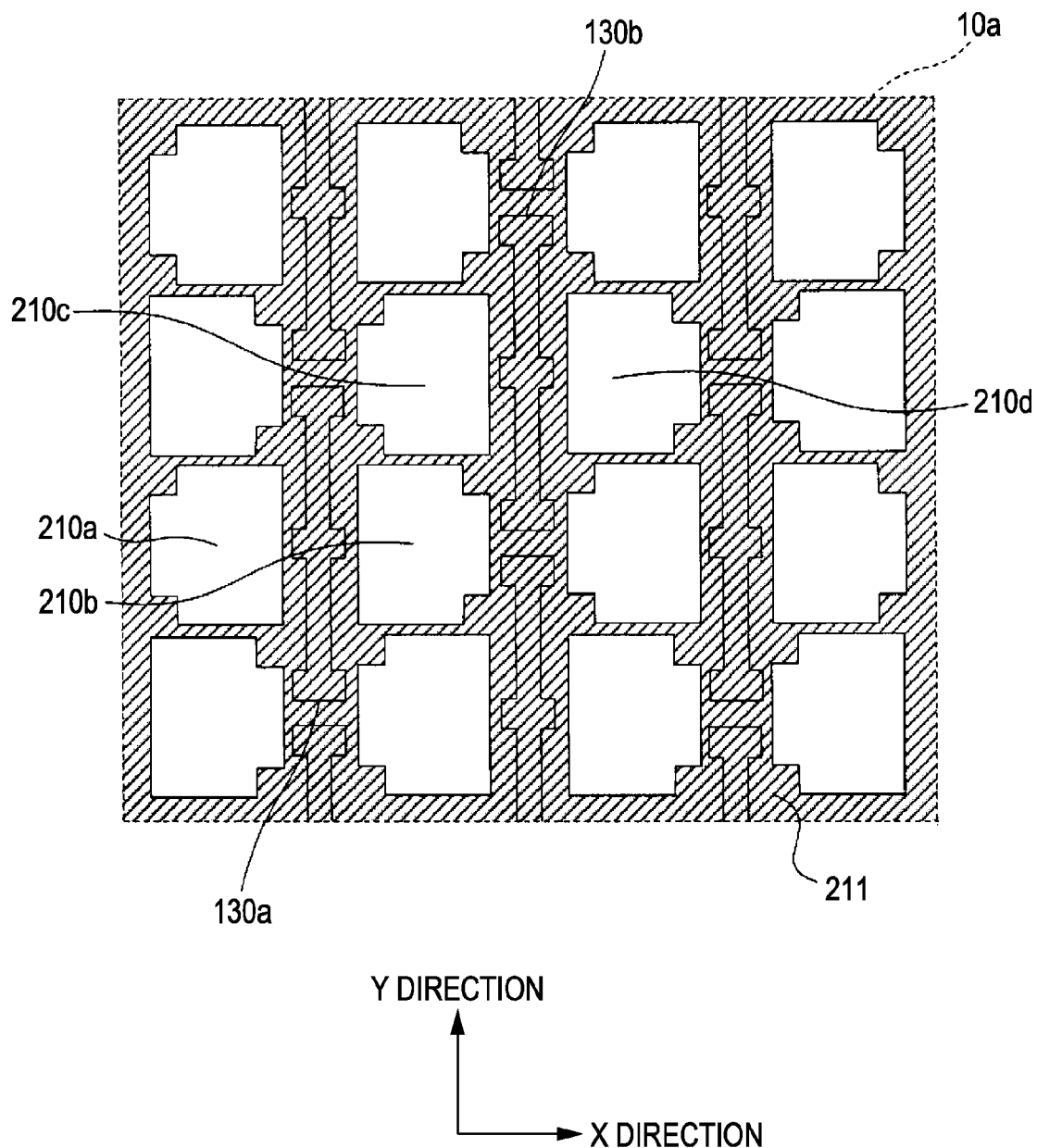
FIG. 8 is a diagrammatic plan view of a portion of image display area of the liquid crystal device according to the first embodiment.

FIG. 8 is a diagrammatic plan view of a portion of the image display area of the liquid crystal device according to the present embodiment. FIG. 9 is a diagrammatic plan view of a portion of the image display area of the liquid crystal device according to the first comparative embodiment shown in FIG. 7.

As shown in FIG. 8, in the liquid crystal device according to the present embodiment, the image display area 10a is formed of aperture regions 210 (that is, aperture regions 210a, 210b, 210c and 210d) through which light may be substantially transmitted in accordance with driving of the liquid crystal and a non-aperture region 211 through which light is not transmitted. The aperture regions 210 and the non-aperture region 211 are defined by the plurality of element portions 130a and 130b, various wirings, and the like. In the liquid crystal device according to the present embodiment, as described with reference to FIG. 4 to FIG. 6, the sizes of the aperture regions 210 are uniform in the image display area 10a. More specifically, the sizes of the aperture regions 210a, 210b, 210c and 210d of the pixels in which the first pixel electrode 9a1, the second pixel electrode 9a2, the third pixel electrode 9a3 and the fourth pixel electrode 9a4 are formed, respectively, are the same.

Note that the first pixel electrode 9a1, the second pixel electrode 9a2, the third pixel electrode 9a3 and the fourth pixel electrode 9a4 are the pixel electrodes 9a that are electrically connected respectively to the first pixel electrode side source/drain region 1c-1, the second pixel electrode side source/drain region 1c-2, the third pixel electrode side source/drain region 1c-3 and the fourth pixel electrode side source/drain region 1c-4 as described above with reference to FIG. 4. In addition, the positional relationship among the first pixel electrode 9a1, the second pixel electrode 9a2, the third pixel electrode 9a3 and the fourth pixel electrode 9a4 will be described in detail later.

Figure 9:
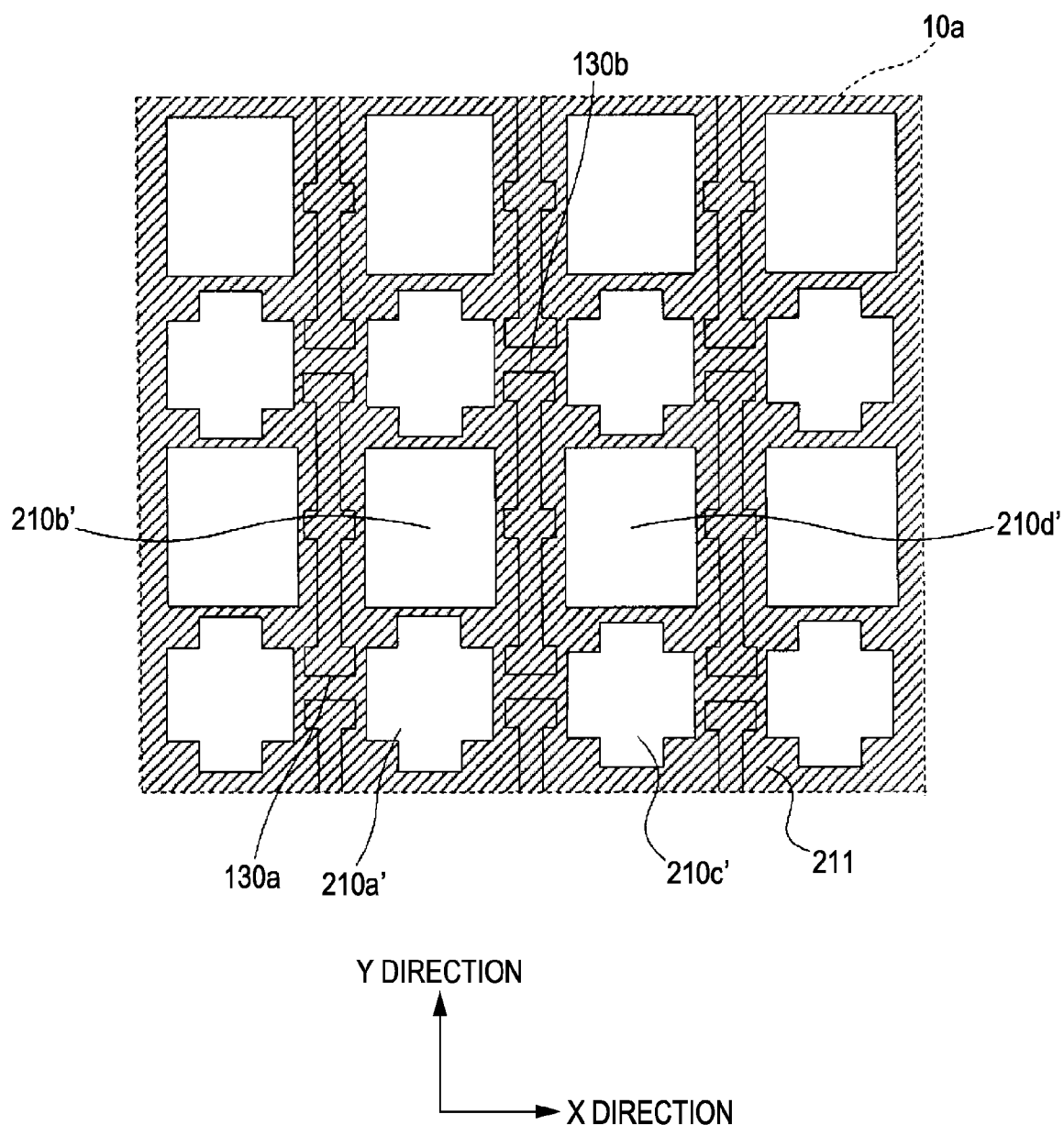
FIG. 9 is a diagrammatic plan view that corresponds to FIG. 8 according to the first comparative embodiment.

On the other hand, as shown in FIG. 9, according to the first comparative embodiment to the present embodiment, because the element portions 130a and 130b are arranged in the same row along the X direction, the area in which the second portion Py2 and the sixth portion Py6 (or the fourth portion Py4 and the eighth portion Py8) that respectively shield the pixel electrode side LDD regions overlap the pixel electrodes 901 and 903 is larger than the area in which the first portion Py1 and the fifth portion Py5 (or the third portion Py3 and the seventh portion Py7) that respectively shield the data line side source/drain regions overlap the pixel electrodes 902 and 904 (see FIG. 7). Thus, the aperture regions 210 of the pixels are different between the rows located adjacent to each other. More specifically, the area of the aperture regions 210a' and 210c' of the pixels in which the pixel electrodes 901 and 903 are respectively formed is different from the area of the aperture regions 210b' and 210d' of the pixels in which the pixel electrodes 902 and 904 are respectively formed, so that display defects, such as display chrominance non-uniformity in the image display area 10a, will occur.

Then, in the liquid crystal device according to the present embodiment, as shown in FIG. 8, because the areas of the aperture regions 210 may be made uniform among the aperture regions 210, it is possible to uniform the aperture ratios among the pixels. Thus, in the liquid crystal device according to the present embodiment, a high-quality image display may be achieved without any display defects, such as display chrominance non-uniformity.

Next, the positional relationship of the pixel electrodes that are electrically connected to the element portions of the liquid crystal device according to the present embodiment will be described with reference to FIG. 10 and FIG. 11 in addition to FIG. 4.

Figure 10:
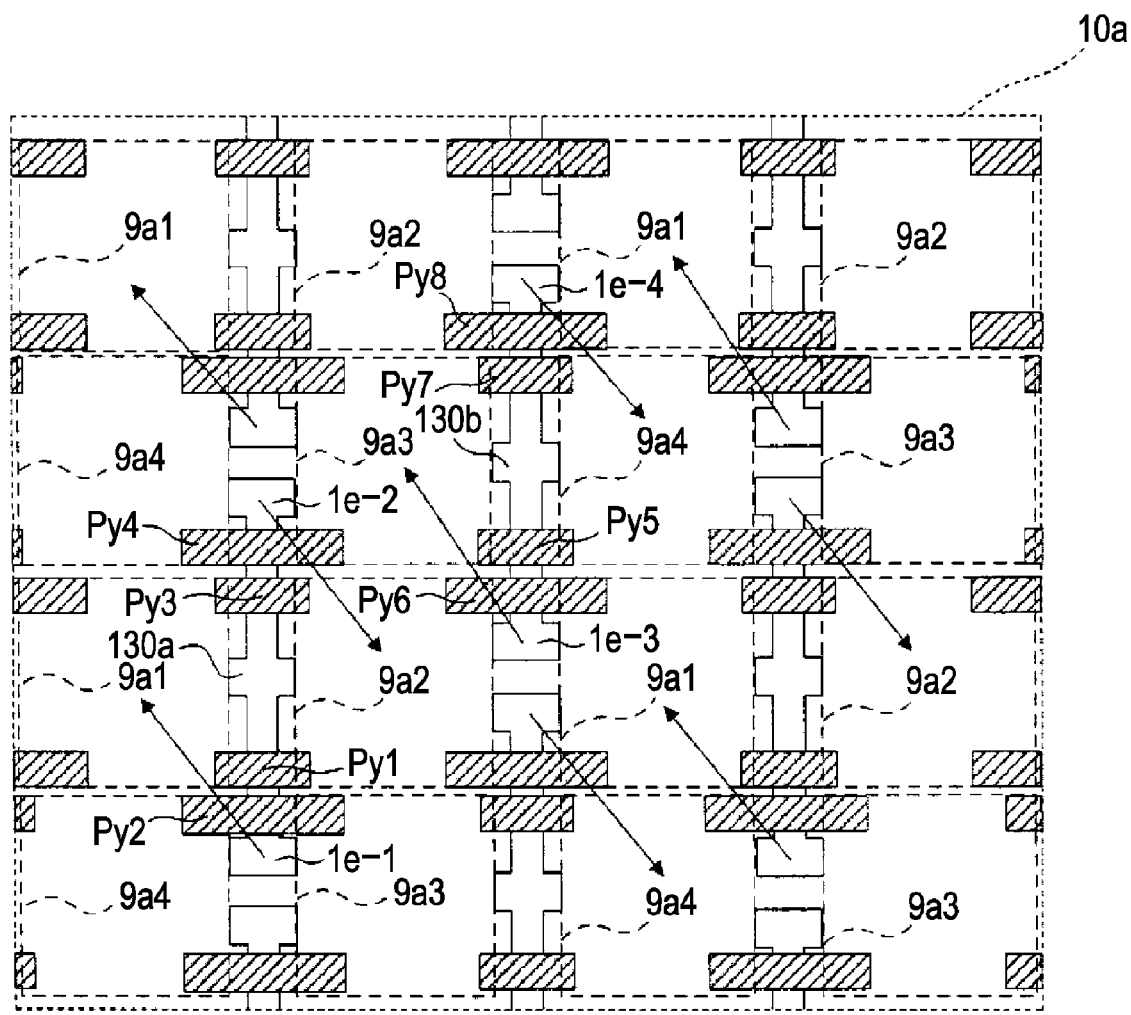
FIG. 10 is a schematic view that shows the positional relationship of pixel electrodes that are electrically connected to the element portions according to the first embodiment.

FIG. 10 is a schematic view that shows the positional relationship of the pixel electrodes that are electrically connected to the element portions of the liquid crystal device according to the present embodiment. FIG. 11 is an electrical schematic view that shows a distribution of parasitic capacitances generated between the data lines and the pixel electrodes in the liquid crystal device according to the present embodiment. Note that FIG. 11 shows the electrical configuration of the portions shown in FIG. 10.

As shown in FIG. 4 and FIG. 10, in the present embodiment, particularly, the first pixel electrode 9a1 and the second pixel electrode 9a2 are respectively arranged, among the plurality of pixels, in the pixels that are located adjacent to each other along the X direction and in which the first portion Py1 of the storage capacitor 70a and the third portion Py3 of the storage capacitor 70a are formed. Note that, in FIG. 10, the arrows indicate that the pixel electrode side source/drain regions 1e-1, 1e-2, 1e-3 and 1e-4 are electrically connected to the pixel electrodes 9a1, 9a2, 9a3 and 9a4, respectively. This also applies to the drawings of FIG. 12, FIG. 14 and FIG. 16, which will be described later.

That is, the first pixel electrode 9a1 and the second pixel electrode 9a2 that are electrically connected to the element portion 130a are provided, among the plurality of pixel electrodes 9a that are arranged in a matrix, as the pixel electrodes 9a that are located adjacent to each other along the X direction while the first pixel electrode 9a1 and the second pixel electrode 9a2 each overlap the first portion Py1 and the third portion Py3 that respectively cover the data line side LDD regions 1b-1 and 1b-2 of the element portion 130a as viewed in plan on the TFT array substrate 10. In other words, the first pixel electrode side source/drain region 1e-1 and the second pixel electrode side source/drain region 1e-2 of the element portion 130a are electrically connected respectively to any one of two pixel electrodes 9a, among the plurality of pixel electrodes 9a that are arranged in a matrix, that are located adjacent to each other along the X direction and that each overlap the first portion Py1 and the third portion Py3 that respectively cover the data line side LDD regions 1b-1 and 1b-2 of the element portion 130a as viewed in plan on the TFT array substrate 10. That is, the first pixel electrode 9a1 and the second pixel electrode 9a2 each are provided so as to partly overlap the first portion Py1 and the third portion Py3 and not to overlap the second portion Py2 or the fourth portion Py4, as viewed in plan on the TFT array substrate 10 (more specifically, in this case, furthermore, the first pixel electrode 9a1 and the second pixel electrode 9a2 each partly overlap the sixth portion Py6 and the eighth portion Py8 and do not overlap the fifth portion Py5 or the seventh portion Py7, as viewed in plan on the TFT array substrate 10). That is, the first pixel electrode 9a1 and the second pixel electrode 9a2 are arranged uniformly, among the plurality of pixels, in the pixels that overlap the first portion Py1 and the third portion Py3 that respectively cover the data line side LDD regions 1b-1 and 1b-2 of the element portion 130a to which the first pixel electrode 9a1 and the second pixel electrode 9a2 are electrically connected.

Thus, it is possible to substantially uniform the display characteristic of the pixel in which the first pixel electrode 9a1 is provided and the display characteristic of the pixel in which the second pixel electrode 9a2 is provided.

More specifically, in FIG. 10, because the first pixel electrode 9a1 and the second pixel electrode 9a2 each partly overlap the first portion Py1 and the third portion Py3 in plan view on the TFT array substrate 10 and do not overlap the second portion Py2 or the fourth portion Py4 (in more detail, in this case, the first pixel electrode 9a1 and the second pixel electrode 9a2 each further partly overlap the sixth portion Py6 and the eighth portion Py8 and do not overlap the fifth portion Py5 or the seventh portion Py7) the area of portions at which the first pixel electrode 9a1 overlaps the portions Py1, ..., Py8 of the storage capacitors 70a that function as light shielding portions and the area of portions at which the second pixel electrode 9a2 overlaps the portions Py1, ..., Py8 may be made substantially the same.

Figure 11:
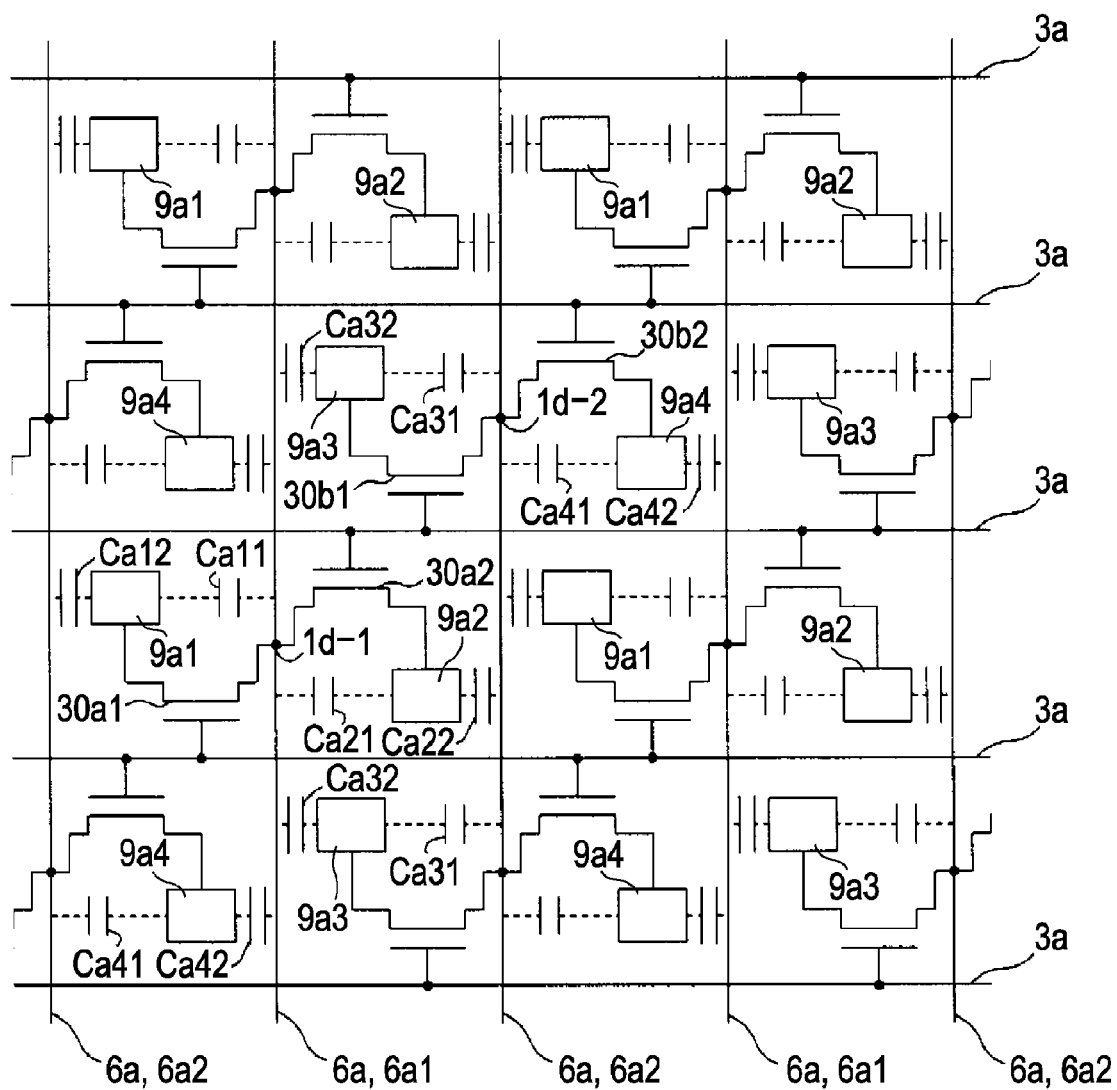
FIG. 11 is an electrical schematic view that shows a distribution of parasitic capacitances generated between data lines and pixel electrodes according to the first embodiment.

Thus, in FIG. 11, it is possible to substantially eliminate a difference between a parasitic capacitance Ca11, formed between a data line 6a1 that is electrically connected to the element portion 130a and the first pixel electrode 9a1, and a parasitic capacitance Ca21, formed between the data line 6a1 and the second pixel electrode 9a2. Furthermore, it is possible to substantially eliminate a difference between a parasitic capacitance Ca12, formed between a data line 6a2 located adjacent to the data line 6a1 that is electrically connected to the element portion 130a (in other words, the data line 6a2 that is electrically connected to the element portion 130b) and the first pixel electrode 9a1, and a parasitic capacitance Ca22, formed between the data line 6a2 and the second pixel electrode 9a2. In this manner, the electric potential holding characteristic in the first pixel electrode 9a1 and the electric potential holding characteristic in the second pixel electrode 9a2 may be made substantially the same. As a result, it is possible to substantially uniform the display characteristic of the pixel in which the first pixel electrode 9a1 is provided and the display characteristic of the pixel in which the second pixel electrode 9a2 is provided.

Moreover, as shown in FIG. 4 and FIG. 10, in the present embodiment, particularly, the third pixel electrode 9a3 and the fourth pixel electrode 9a4 are respectively arranged, among the plurality of pixels, in the pixels that are located adjacent to each other along the X direction and in which the fifth portion Py5 of the storage capacitor 70a and the seventh portion Py7 of the storage capacitor 70a are formed.

That is, the third pixel electrode 9a3 and the fourth pixel electrode 9a4 that are electrically connected to the element portion 130b are provided, among the plurality of pixel electrodes 9a that are arranged in a matrix, as the pixel electrodes 9a that are located adjacent to each other along the X direction while the third pixel electrode 9a3 and the fourth pixel electrode 9a4 each overlap the fifth portion Py5 and the seventh portion Py7 that respectively cover the data line side LDD regions 1b-3 and 1b-4 of the element portion 130b as viewed in plan on the TFT array substrate 10. That is, as in the case of the positional relationship between the first pixel electrode 9a1 and second pixel electrode 9a2 and the first portion Py1, second portion Py2, third portion Py3 and fourth portion Py4, the third pixel electrode 9a3 and the fourth pixel electrode 9a4 each are provided so as to partly overlap the fifth portion Py5 and the seventh portion Py7 and not to overlap the sixth portion Py6 or the eighth portion Py8, as viewed in plan on the TFT array substrate 10 (more specifically, in this case, furthermore, the third pixel electrode 9a3 and the fourth pixel electrode 9a4 each partly overlap the second portion Py2 and the fourth portion Py4 and do not overlap the first portion Py1 or the third portion Py3, as viewed in plan on the TFT array substrate 10). That is, the third pixel electrode 9a3 and the fourth pixel electrode 9a4 are arranged uniformly, among the plurality of pixels, in the pixels that overlap the fifth portion Py5 and the seventh portion Py7 that respectively cover the data line side LDD regions 1b-3 and 1b-4 of the element portion 130b to which the third pixel electrode 9a3 and the fourth pixel electrode 9a4 are electrically connected.

Thus, it is possible to substantially uniform the display characteristic of the pixel in which the third pixel electrode 9a3 is provided and the display characteristic of the pixel in which the fourth pixel electrode 9a4 is provided.

More specifically, in FIG. 10, because the third pixel electrode 9a3 and the fourth pixel electrode 9a4 each partly overlap the fifth portion Py5 and the seventh portion Py7 in plan view on the TFT array substrate 10 and do not overlap the sixth portion Py6 or the eighth portion Py8 (in more detail, in this case, the third pixel electrode 9a3 and the fourth pixel electrode 9a4 each further partly overlap the second portion Py2 and the fourth portion Py4 and do not overlap the first portion Py1 or the third portion Py3), the area of portions at which the third pixel electrode 9a3 overlaps the portions Py1, ..., Py8 of the storage capacitors 70a that function as light shielding portions and the area of portions at which the fourth pixel electrode 9a4 overlaps the portions Py1, ..., Py8 may be made substantially the same.

Thus, in FIG. 11, it is possible to substantially eliminate a difference between a parasitic capacitance Ca31, formed between the data line 6a2 that is electrically connected to the element portion 130b and the third pixel electrode 9a3, and a parasitic capacitance Ca41, formed between the data line 6a2 and the fourth pixel electrode 9a4. Furthermore, it is possible to substantially eliminate a difference between a parasitic capacitance Ca32, formed between the data line 6a1 located adjacent to the data line 6a2 that is electrically connected to the element portion 130b (in other words, the data line 6a1 that is electrically connected to the element portion 130a) and the third pixel electrode 9a3, and a parasitic capacitance Ca42, formed between the data line 6a1 and the fourth pixel electrode 9a4. In this manner, the electric potential holding characteristic in the third pixel electrode 9a3 and the electric potential holding characteristic in the fourth pixel electrode 9a4 may be made substantially the same. As a result, it is possible to substantially uniform the display characteristic of the pixel in which the third pixel electrode 9a3 is provided and the display characteristic of the pixel in which the fourth pixel electrode 9a4 is provided.

In addition, in the present embodiment, the first portion Py1, the third portion Py3, the fifth portion Py5 and the seventh portion Py7 are formed to have the same shape, and the second portion Py2, the fourth portion Py4, the sixth portion Py6 and the eighth portion Py8 are formed to have the same shape. Thus, it is possible to further reliably substantially uniform the display characteristics of the pixels in which the first pixel electrode 9a1, the second pixel electrode 9a2, the third pixel electrode 9a3 and the fourth pixel electrode 9a4 are provided. That is, it is possible to substantially uniform the display characteristics of the pixels that constitute the image display area 10a. As a result, it is possible to improve the quality of a display image that is displayed on the image display area 10a.

Figure 12:
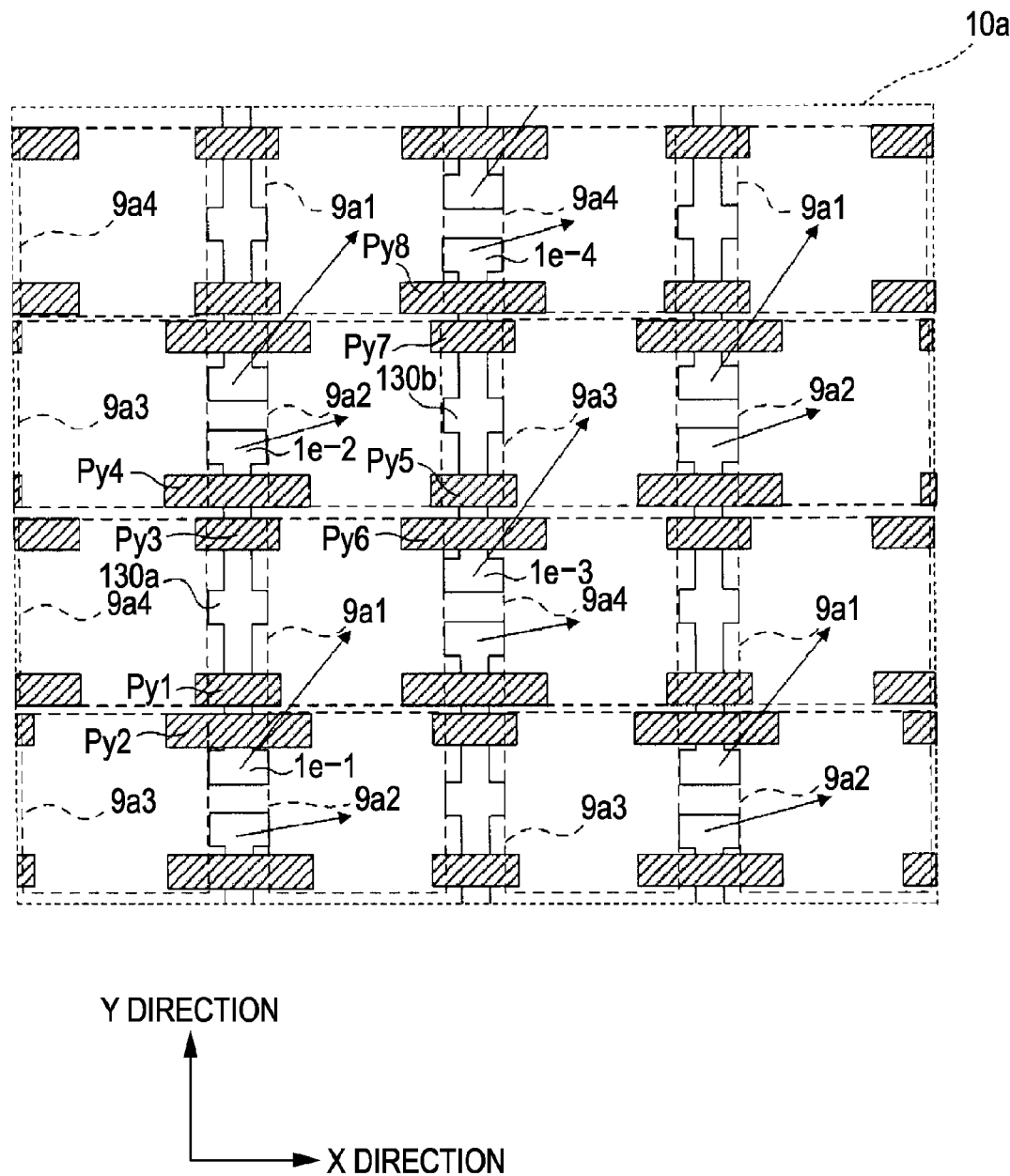
FIG. 12 is a schematic view that corresponds to FIG. 10 according to a second comparative embodiment.
Figure 13:
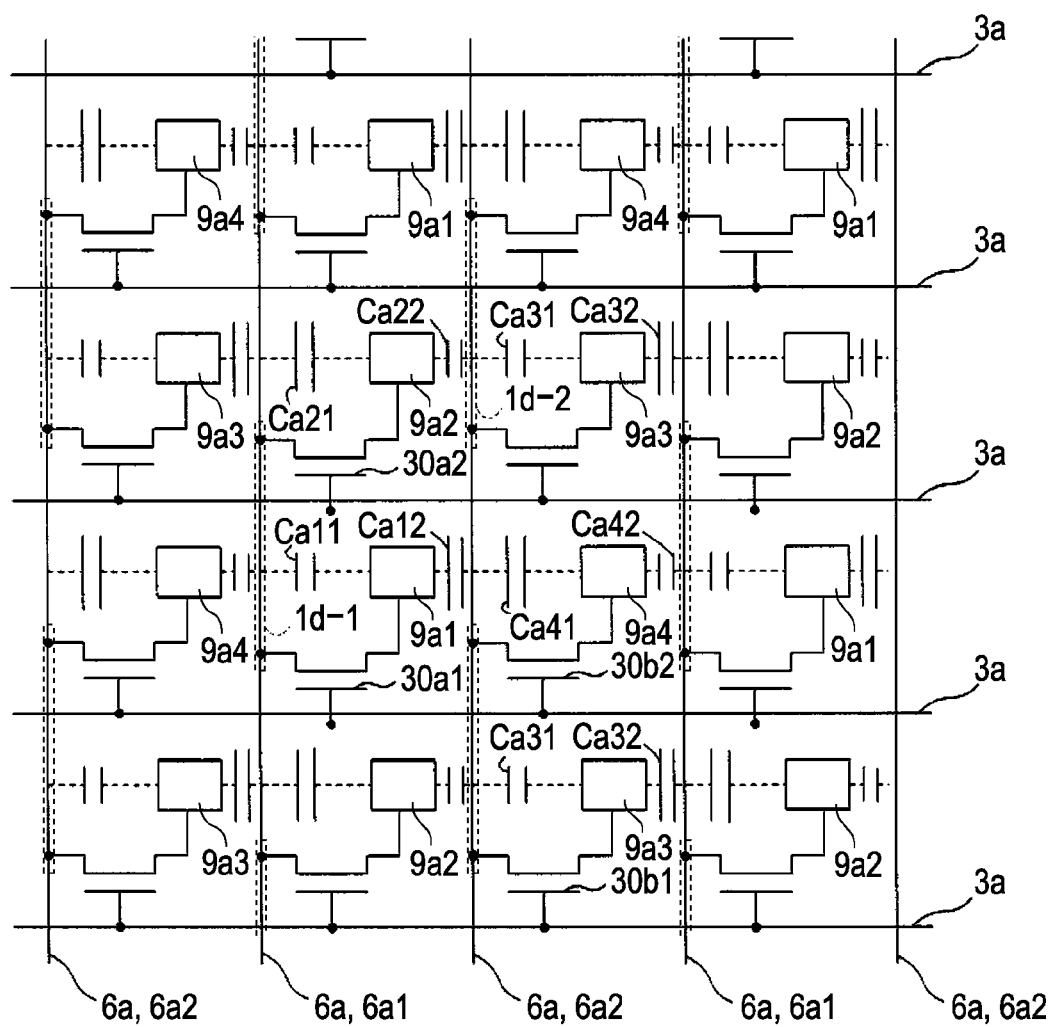
FIG. 13 is a schematic view that corresponds to FIG. 11 according to the second comparative embodiment.

FIG. 12 is a schematic view that corresponds to FIG. 10 according to a second comparative embodiment of the present embodiment. FIG. 13 is a schematic view that corresponds to FIG. 11 according to the second comparative embodiment of the present embodiment.

As shown in FIG. 12 as the second comparative embodiment, if the first pixel electrode 9a1 and the second pixel electrode 9a2 are provided as the pixel electrodes 9a that are located adjacent to each other in the Y direction, that is, for example, the first pixel electrode 9a1 is provided as the pixel electrode 9a that partly overlaps the first portion Py1 and the third portion Py3 (in more detail, furthermore, the first pixel electrode 9a1 partly overlaps the sixth portion Py6 and the eighth portion Py8 and does not overlap the second portion Py2, the fourth portion Py4, the fifth portion Py5 or the seventh portion Py7) and the second pixel electrode 9a2 is provided as the pixel electrode 9a that partly overlaps the second portion Py2 and the fourth portion Py4 (in more detail, furthermore, the second pixel electrode 9a2 partly overlaps the fifth portion Py5 and the seventh portion Py7 and does not overlap the first portion Py1, the third portion Py3, the sixth portion Py6 or the eighth portion Py8), the area of the portions at which the first pixel electrode 9a1 overlaps the portions Py1, ..., Py8 is different from the area of the portions at which the second pixel electrode 9a2 overlaps the portions Py1, ..., Py8.

Thus, in FIG. 13, the parasitic capacitance Ca11, formed between the data line 6a1 that is electrically connected to the element portion 130a (that is, the TFTs 30a1 and 30a2) and the first pixel electrode 9a1, and the parasitic capacitance Ca21, formed between the data line 6a1 and the second pixel electrode 9a2, are different from each other. More specifically, because the area of the portions at which the first pixel electrode 9a1 overlaps the first portion Py1 and the third portion Py3 is smaller than the area of the portions at which the second pixel electrode 9a2 overlaps the second portion Py2 and the fourth portion Py4, the parasitic capacitance Ca11, formed between the data line 6a1 and the first pixel electrode 9a1, is a capacitance value that is smaller than the parasitic capacitance Ca21, formed between the data line 6a1 and the second pixel electrode 9a2. Moreover, in this case, the parasitic capacitance Ca12, formed between the data line 6a2 that is located adjacent to the data line 6a1 that is electrically connected to the element portion 130a (in other words, the data line 6a2 that is electrically connected to the element portion 130b) and the first pixel electrode 9a1, and the parasitic capacitance Ca22, formed between the data line 6a2 and the second pixel electrode 9a2, are different from each other. More specifically, because the area of the portions at which the first pixel electrode 9a1 overlaps the sixth portion Py6 and the eighth portion Py8 is larger than the area of the portions at which the second pixel electrode 9a2 overlaps the fifth portion Py5 and the seventh portion Py7, the parasitic capacitance Ca12 formed between the data line 6a2 and the first pixel electrode 9a1 is a capacitance value that is larger than the parasitic capacitance Ca22 formed between the data line 6a2 and the second pixel electrode 9a2. Therefore, there is a possibility that the electric potential holding characteristic in the first pixel electrode 9a1 and the electric potential holding characteristic in the second pixel electrode 9a2 will be different from each other. Thus, there is a possibility that the display characteristic of the pixel in which the first pixel electrode 9a1 is provided and the display characteristic of the pixel in which the second pixel electrode 9a2 is provided will be different from each other.

In addition, in the second comparative embodiment shown in FIG. 12, as described above, as in the case where the area of portions at which the first pixel electrode 9a1 overlaps the portions Py1, ..., Py8 and the area of portions at which the second pixel electrode 9a2 overlaps the portions Py1, ..., Py8 are different from each other, the area of portions at which the third pixel electrode 9a3 overlaps the portions Py1, ..., Py8 and the area of portions at which the fourth pixel electrode 9a4 overlaps the portions Py1, ..., Py8 are different from each other. For this reason, there is a possibility that the display characteristic of the pixel in which the third pixel electrode 9a3 is provided and the display characteristic of the pixel in which the fourth pixel electrode 9a4 is provided will be different from each other.

Particularly in the present embodiment, as described above, the first pixel electrode 9a1 and the second pixel electrode 9a2 are respectively arranged, among the plurality of pixels, in the pixels in which the first portion Py1 of the storage capacitor 70a and the third portion Py3 of the storage capacitor 70a are formed and which are located adjacent to each other along the X direction, and, furthermore, the third pixel electrode 9a3 and the fourth pixel electrode 9a4 are respectively arranged, among the plurality of pixels, in the pixels in which the fifth portion Py5 of the storage capacitor 70a and the seventh portion Py7 of the storage capacitor 70a are formed and which are located adjacent to each other along the X direction. That is, the first pixel electrode 9a1, the second pixel electrode 9a2, the third pixel electrode 9a3 and the fourth pixel electrode 9a4 are arranged uniformly, among the plurality of pixels, in the pixels that overlap the portions Py (that is, the first portion Py1, ..., the seventh portion Py7 or the eighth portion Py8) that function as light shielding portions that covers the data line side LDD regions 1b (that is, the data line side LDD regions 1b-1, 1b-2, 1b-3 or 1b-4) of the TFT 30 (that is, the TFT 30a1, 30a2, 30b1 or 30b2) to which the pixel electrodes 9a (that is, the first pixel electrode 9a1, the second pixel electrode 9a2, the third pixel electrode 9a3 or the fourth pixel electrode 9a4) are electrically connected. Thus, it is possible to further reliably substantially uniform the display characteristics of the pixels in which the first pixel electrode 9a1, the second pixel electrode 9a2, the third pixel electrode 9a3 and the fourth pixel electrode 9a4 are provided.

As described above, in the liquid crystal device according to the present embodiment, it is possible to reduce display defects, such as flicker, that may occur because of a light leakage current generated and also possible to reduce display defects because of a difference in aperture ratio among the pixels, without an unnecessary decrease in aperture ratio. Furthermore, it is possible to uniform the display characteristics among the pixels. As a result, with the liquid crystal device according to the present embodiment, a high-quality image display may be achieved.

Second Embodiment

A liquid crystal device according to a second embodiment will be described with reference to FIG. 14 and FIG. 15.

Figure 14:
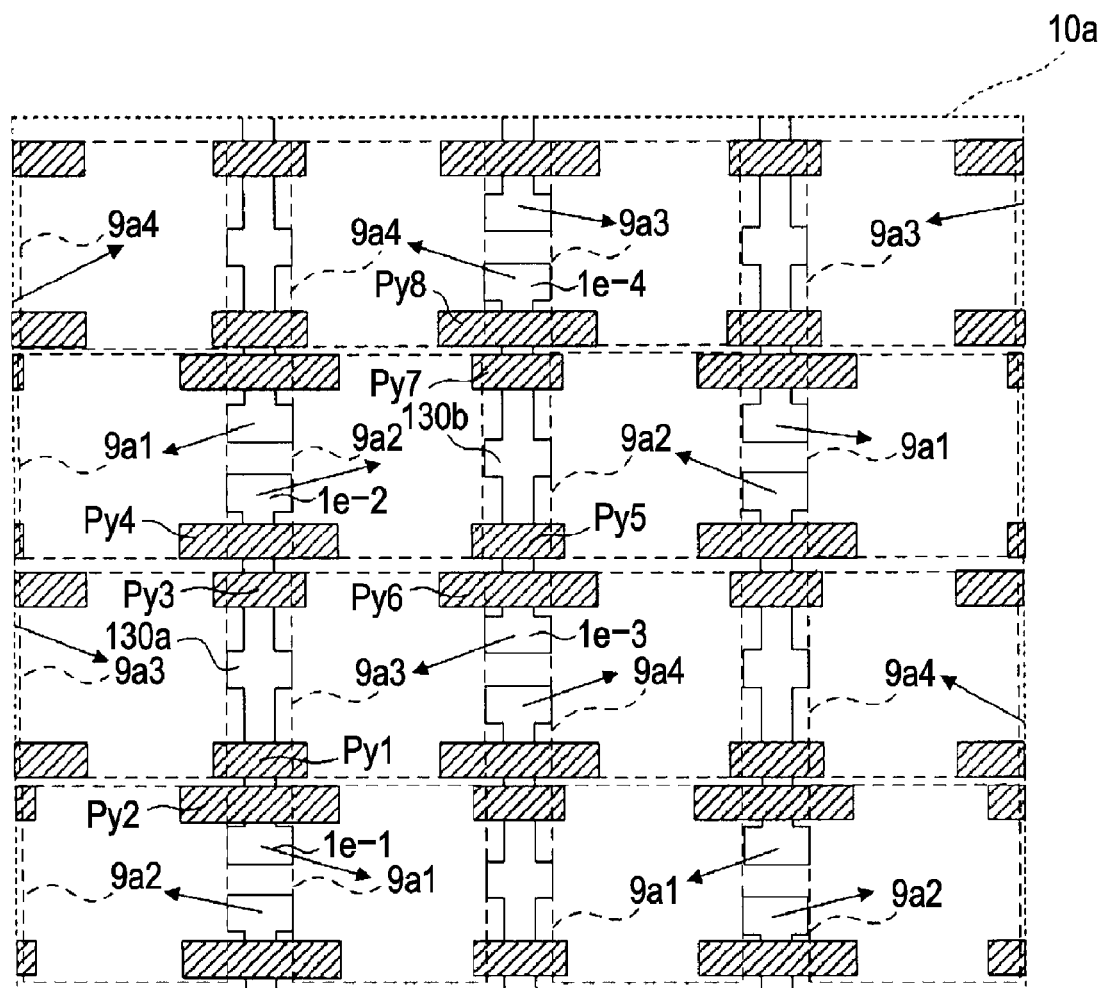
FIG. 14 is a schematic view that corresponds to FIG. 10 according to a second embodiment.

FIG. 14 is a schematic view that corresponds to FIG. 10 according to the second embodiment. FIG. 15 is a schematic view that corresponds to FIG. 11 according to the second embodiment. Note that FIG. 15 shows the electrical configuration of the portions shown in FIG. 14. In FIG. 14 and FIG. 15, the same reference numerals are assigned to the same components as those of the first embodiment shown in FIG. 1 to FIG. 11, and the description thereof is omitted where appropriate.

As shown in FIG. 14, the liquid crystal device according to the second embodiment is different in arrangement of the first pixel electrode 9a1, the second pixel electrode 9a2, the third pixel electrode 9a3 and the fourth pixel electrode 9a4 in comparison with the liquid crystal device according to the above described first embodiment, and the portions other than the above have substantially the same configuration as those of the liquid crystal device according to the above described first embodiment.

As shown in FIG. 14, particularly in the present embodiment, the first pixel electrode 9a1 is arranged, among the plurality of pixels, in any one of the pixels in which the second portion Py2 of the storage capacitor 70a is formed (in more detail, the second portion Py2 that covers the pixel electrode side LDD region 1c-1 of the element portion 130a to which the first pixel electrode 9a1 is electrically connected) and which are located adjacent to each other along the X direction, and the second pixel electrode 9a2 is arranged, among the plurality of pixels, in any one of the pixels in which the fourth portion Py4 of the storage capacitor 70a is formed (in more detail, the fourth portion Py4 that covers the pixel electrode side LDD region 1c-2 of the element portion 130a to which the second pixel electrode 9a2 is electrically connected) and which are located adjacent to each other along the X direction. Furthermore, the first pixel electrode 9a1 and the second pixel electrode 9a2 are arranged on the same side relative to the element portion 130a (that is, in the drawing, on the right side or on the left side relative to the element portion 130a) to which the first pixel electrode 9a1 and the second pixel electrode 9a2 are electrically connected.

That is, the first pixel electrode 9a1 and the second pixel electrode 9a2 that are electrically connected to the element portion 130a are provided, among the plurality of pixel electrodes 9a that are arranged in a matrix, as the pixel electrodes 9a that respectively overlap the second portion Py2 and the fourth portion Py4 that respectively cover the pixel electrode side LDD regions 1c-1 and 1c-2 of the element portion 130a as viewed in plan on the TFT array substrate 10. In other words, the first pixel electrode side source/drain region 1e-1 and the second pixel electrode side source/drain region 1e-2 of the element portion 130a are electrically connected respectively to any one of two pixel electrodes 9a, among the plurality of pixel electrodes 9a that are arranged in a matrix, that respectively overlap the second portion Py2 and the fourth portion Py4 that have widths that are larger in the X direction than the widths of the first portion Py1 and the third portion Py3 that respectively cover the data line side LDD regions 1b-1 and 1b-2 of the element portion 130a as viewed in plan on the TFT array substrate 10. That is, the first pixel electrode 9a1 and the second pixel electrode 9a2 each are provided so as to partly overlap the second portion Py2 or the fourth portion Py4 and not to overlap the first portion Py1 or the third portion Py3, as viewed in plan on the TFT array substrate 10. That is, the first pixel electrode 9a1 and the second pixel electrode 9a2 are arranged uniformly, among the plurality of pixels, in the pixels respectively that overlap the second portion Py2 and the fourth portion Py4 that respectively cover the pixel electrode side LDD regions 1c-1 and 1c-2 of the element portion 130a to which the first pixel electrode 9a1 and the second pixel electrode 9a2 are electrically connected.

Thus, it is possible to substantially uniform the display characteristic of the pixel in which the first pixel electrode 9a1 is provided and the display characteristic of the pixel in which the second pixel electrode 9a2 is provided.

Figure 15:
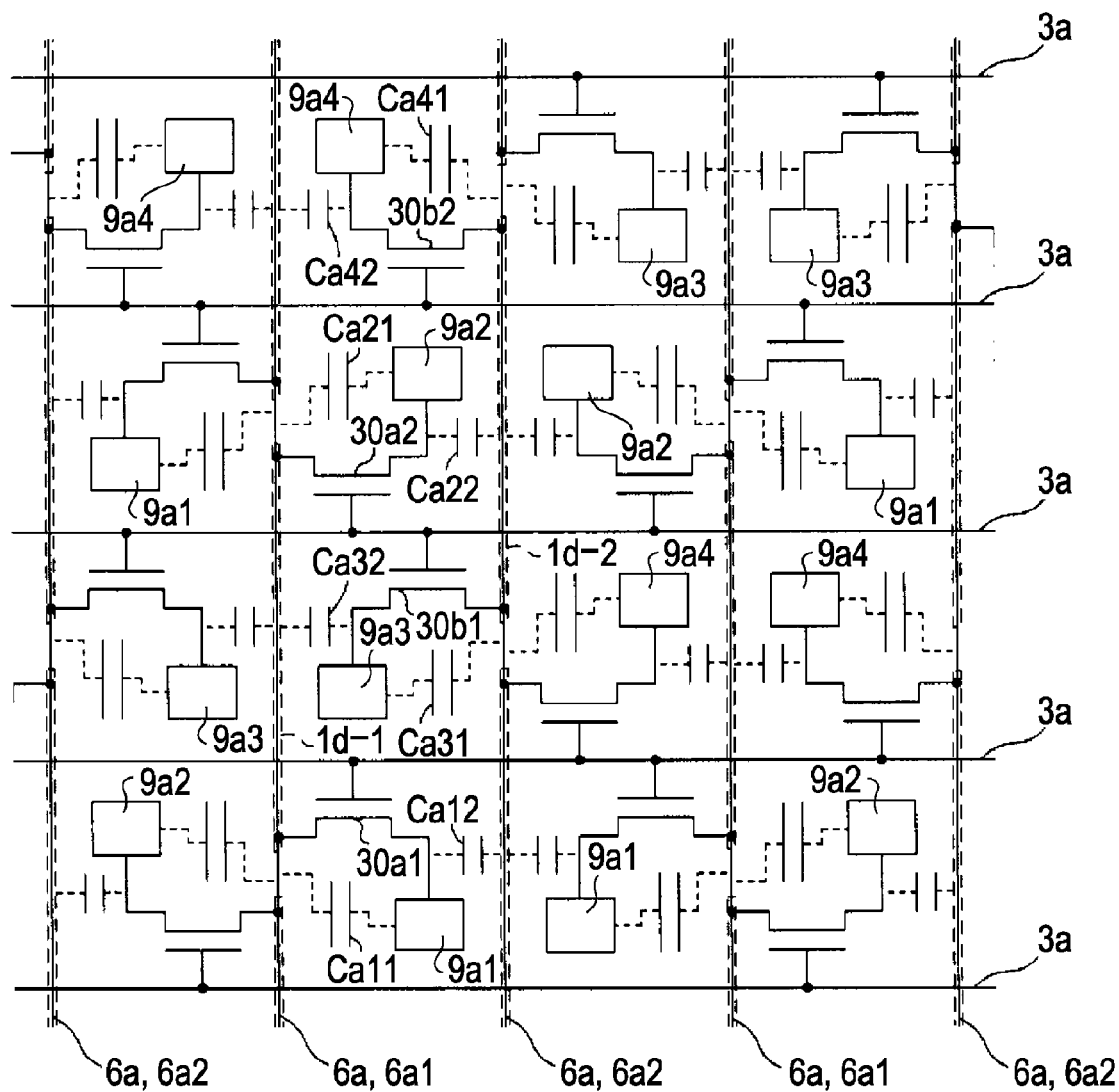
FIG. 15 is a schematic view that corresponds to FIG. 11 according to the second embodiment.

Thus, in FIG. 15, it is possible to substantially eliminate a difference between the parasitic capacitance Ca11, formed between the data line 6a1 that is electrically connected to the element portion 130a and the first pixel electrode 9a1, and the parasitic capacitance Ca21, formed between the data line 6a1 and the second pixel electrode 9a2. Furthermore, it is possible to substantially eliminate a difference between the parasitic capacitance Ca12, formed between the data line 6a2 located adjacent to the data line 6a1 that is electrically connected to the element portion 130a (in other words, the data line 6a2 that is electrically connected to the element portion 130b) and the first pixel electrode 9a1, and the parasitic capacitance Ca22, formed between the data line 6a2 and the second pixel electrode 9a2. In this manner, the electric potential holding characteristic in the first pixel electrode 9a1 and the electric potential holding characteristic in the second pixel electrode 9a2 may be made substantially the same.

Moreover, as shown in FIG. 14, particularly in the present embodiment, the third pixel electrode 9a3 is arranged, among the plurality of pixels, in any one of the pixels in which the sixth portion Py6 of the storage capacitor 70a is formed (in more detail, the sixth portion Py6 that covers the pixel electrode side LDD region 1c-3 of the element portion 130b to which the third pixel electrode 9a3 is electrically connected) and which are located adjacent to each other along the X direction, and the fourth pixel electrode 9a4 is arranged, among the plurality of pixels, in any one of the pixels in which the eighth portion Py8 of the storage capacitor 70a is formed (in more detail, the eighth portion Py8 that covers the pixel electrode side LDD region 1c-4 of the element portion 130b to which the fourth pixel electrode 9a4 is electrically connected) and which are located adjacent to each other along the X direction. Furthermore, the third pixel electrode 9a3 and the fourth pixel electrode 9a4 are arranged on the same side relative to the element portion 130b (that is, in the drawing, on the right side or on the left side relative to the element portion 130b) to which the third pixel electrode 9a3 and the fourth pixel electrode 9a4 are electrically connected.

That is, the third pixel electrode 9a3 and the fourth pixel electrode 9a4 that are electrically connected to the element portion 130b are provided, among the plurality of pixel electrodes 9a that are arranged in a matrix, as the pixel electrodes 9a that respectively overlap the sixth portion Py6 and the eighth portion Py8 that respectively cover the pixel electrode side LDD regions 1c-3 and 1c-4 of the element portion 130b as viewed in plan on the TFT array substrate 10. In other words, the third pixel electrode side source/drain region 1e-3 and the fourth pixel electrode side source/drain region 1e-4 of the element portion 130b are electrically connected respectively to any one of two pixel electrodes 9a, among the plurality of pixel electrodes 9a that are arranged in a matrix, that respectively overlap the sixth portion Py6 and the eighth portion Py8 that have widths that are larger in the X direction than the widths of the fifth portion Py5 and the seventh portion Py7 that respectively cover the data line side LDD regions 1b-3 and 1b-4 of the element portion 130b as viewed in plan on the TFT array substrate 10. That is, the third pixel electrode 9a3 and the fourth pixel electrode 9a4 each are provided so as to partly overlap the sixth portion Py6 or the eighth portion Py8 and not to overlap the fifth portion Py5 or the seventh portion Py7, as viewed in plan on the TFT array substrate 10. That is, the third pixel electrode 9a3 and the fourth pixel electrode 9a4 are arranged uniformly, among the plurality of pixels, in the pixels that respectively overlap the sixth portion Py6 and the eighth portion Py8 that respectively cover the pixel electrode side LDD regions 1c-3 and 1c-4 of the element portion 130b to which the third pixel electrode 9a3 and the fourth pixel electrode 9a4 are electrically connected.

Thus, it is possible to substantially uniform the display characteristic of the pixel in which the third pixel electrode 9a3 is provided and the display characteristic of the pixel in which the fourth pixel electrode 9a4 is provided.

Thus, in FIG. 15, it is possible to substantially eliminate a difference between a parasitic capacitance Ca31, formed between a data line 6a2 that is electrically connected to the element portion 130b and the third pixel electrode 9a3, and a parasitic capacitance Ca41, formed between the data line 6a2 and the fourth pixel electrode 9a4. Furthermore, it is possible to substantially eliminate a difference between a parasitic capacitance Ca32, formed between the data line 6a1 located adjacent to the data line 6a2 that is electrically connected to the element portion 130b (in other words, the data line 6a1 that is electrically connected to the element portion 130a) and the third pixel electrode 9a3, and a parasitic capacitance Ca42, formed between the data line 6a1 and the fourth pixel electrode 9a4. In this manner, the electric potential holding characteristic in the third pixel electrode 9a3 and the electric potential holding characteristic in the fourth pixel electrode 9a4 may be made substantially the same.

In addition, in the liquid crystal device according to present embodiment, as in the case of the liquid crystal device according to the first embodiment, the first portion Py1, the third portion Py3, the fifth portion Py5 and the seventh portion Py7 are formed to have the same shape, and the second portion Py2, the fourth portion Py4, the sixth portion Py6 and the eighth portion Py8 are formed to have the same shape. Thus, it is possible to further reliably substantially uniform the display characteristics of the pixels in which the first pixel electrode 9a1, the second pixel electrode 9a2, the third pixel electrode 9a3 and the fourth pixel electrode 9a4 are provided.

Figure 16:
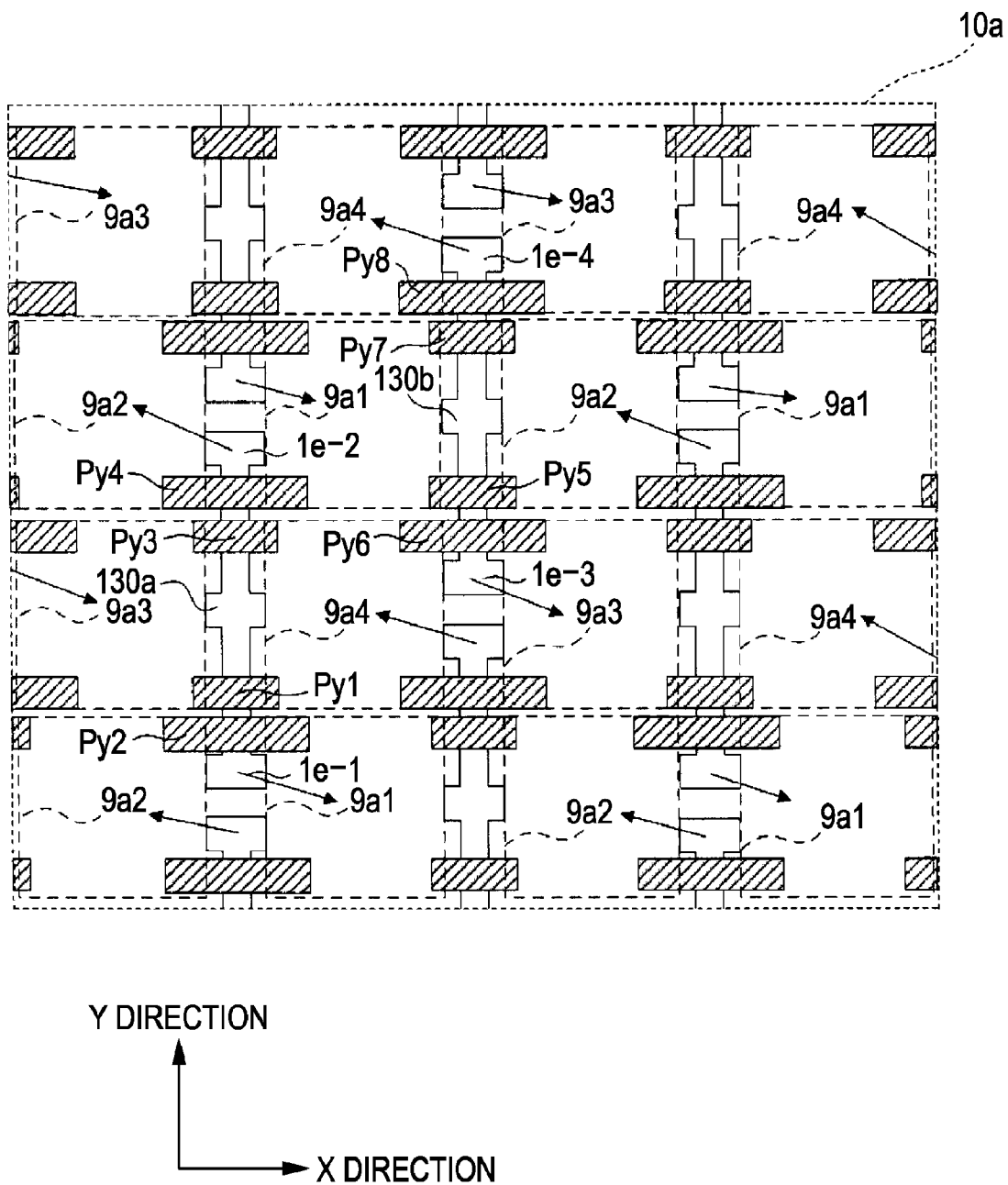
FIG. 16 is a schematic view that corresponds to FIG. 10 according to an alternative embodiment to the second embodiment.
Figure 17:
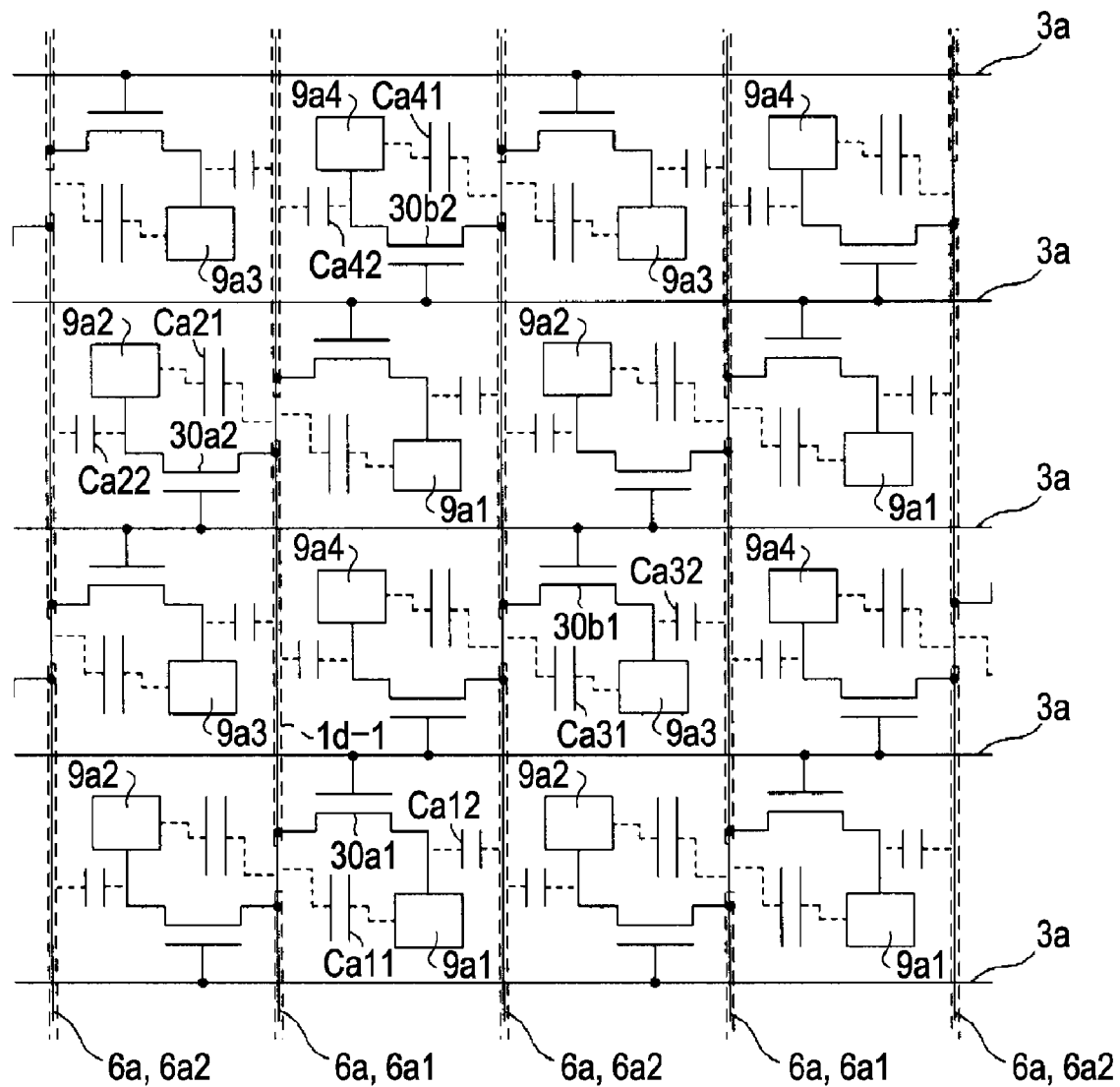
FIG. 17 is a schematic view that corresponds to FIG. 11 according to an alternative embodiment to the second embodiment.

Note that, in the present embodiment, as described above, the first pixel electrode 9a1 and the second pixel electrode 9a2 are arranged on the same side relative to the element portion 130a (that is, in the drawing, on the right side or on the left side relative to the element portion 130a) to which the first pixel electrode 9a1 and the second pixel electrode 9a2 are electrically connected, and the third pixel electrode 9a3 and the fourth pixel electrode 9a4 are arranged on the same side relative to the element portion 130b (that is, in the drawing, on the right side or on the left side relative to the element portion 130b) to which the third pixel electrode 9a3 and the fourth pixel electrode 9a4 are electrically connected. However, it may be configured as in the case of an alternative embodiment shown in FIG. 16 and FIG. 17. FIG. 16 is a schematic view that corresponds to FIG. 10 according to the alternative embodiment to the present embodiment. FIG. 17 is a schematic view that corresponds to FIG. 11 according to the alternative embodiment to the present embodiment. FIG. 17 shows the electrical configuration of the portions shown in FIG. 16.

That is, as shown in FIG. 16 as the alternative embodiment, it may be configured so that the first pixel electrode 9a1 and the second pixel electrode 9a2 are arranged on the sides different from each other with respect to the element portion 130a to which the first pixel electrode 9a1 and the second pixel electrode 9a2 are electrically connected (that is, in the drawing, the first pixel electrode 9a1 is arranged on the right side with respect to the element portion 130a to which the first pixel electrode 9a1 is electrically connected, and the second pixel electrode 9a2 is arranged on the left side with respect to the element portion 130a to which the second pixel electrode 9a2 is electrically connected), and the third pixel electrode 9a3 and the fourth pixel electrode 9a4 are arranged on the sides different from each other with respect to the element portion 130b to which the third pixel electrode 9a3 and the fourth pixel electrode 9a4 are electrically connected (in the drawing, the third pixel electrode 9a3 is arranged on the right side with respect to the element portion 130b to which the third pixel electrode 9a3 is electrically connected, and the fourth pixel electrode 9a4 is arranged on the left side with respect to the element portion 130b to which the fourth pixel electrode 9a4 is electrically connected).

In this case as well, the first pixel electrode 9a1 and the second pixel electrode 9a2 are arranged uniformly, among the plurality of pixels, in the pixels that respectively overlap the second portion Py2 and the fourth portion Py4 that respectively cover the pixel electrode side LDD regions 1c-1 and 1c-2 of the element portion 130a to which the first pixel electrode 9a1 and the second pixel electrode 9a2 are electrically connected, and the third pixel electrode 9a3 and the fourth pixel electrode 9a4 are arranged uniformly, among the plurality of pixels, in the pixels that respectively overlap the sixth portion Py6 and the eighth portion Py8 that respectively cover the pixel electrode side LDD regions 1c-3 and 1c-4 of the element portion 130b to which the third pixel electrode 9a3 and the fourth pixel electrode 9a4 are electrically connected.

Thus, in FIG. 17, it is possible to substantially eliminate a difference between a parasitic capacitance Ca11, formed between the data line 6a1 that is electrically connected to the element portion 130a and the first pixel electrode 9a1, and a parasitic capacitance Ca21, formed between the data line 6a1 and the second pixel electrode 9a2. Furthermore, it is possible to substantially eliminate a difference between a parasitic capacitance Ca12, formed between a data line 6a2 located adjacent to the data line 6a1 that is electrically connected to the element portion 130a (in other words, the data line 6a2 that is electrically connected to the element portion 130b) and the first pixel electrode 9a1, and a parasitic capacitance Ca22, formed between the data line 6a2 and the second pixel electrode 9a2. In this manner, the electric potential holding characteristic in the first pixel electrode 9a1 and the electric potential holding characteristic in the second pixel electrode 9a2 may be made substantially the same. Moreover, it is possible to substantially eliminate a difference between a parasitic capacitance Ca31, formed between a data line 6a2 that is electrically connected to the element portion 130b and the third pixel electrode 9a3, and a parasitic capacitance Ca41, formed between the data line 6a2 and the fourth pixel electrode 9a4. Furthermore, it is possible to substantially eliminate a difference between a parasitic capacitance Ca32, formed between the data line 6a1 located adjacent to the data line 6a2 that is electrically connected to the element portion 130b (in other words, the data line 6a1 that is electrically connected to the element portion 130a) and the third pixel electrode 9a3, and a parasitic capacitance Ca42, formed between the data line 6a1 and the fourth pixel electrode 9a4. In this manner, the electric potential holding characteristic in the third pixel electrode 9a3 and the electric potential holding characteristic in the fourth pixel electrode 9a4 may be made substantially the same.

Thus, as in the case of the liquid crystal device according to the above described second embodiment, it is possible to substantially uniform the display characteristics of the pixels in which the first pixel electrode 9a1, the second pixel electrode 9a2, the third pixel electrode 9a3 and the fourth pixel electrode 9a4 are provided.

Electronic Apparatus

Figure 18:
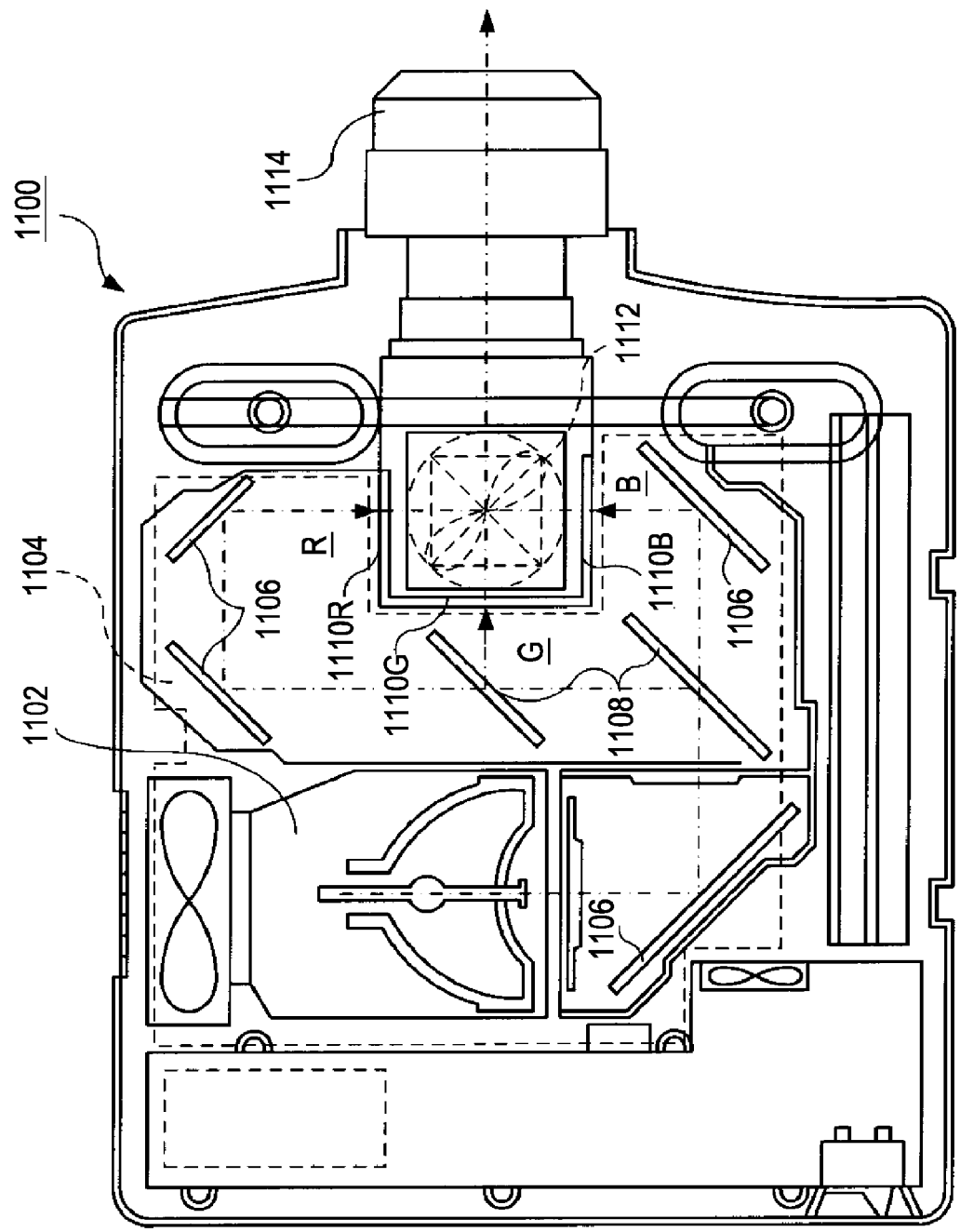
FIG. 18 is a plan view that shows the configuration of a projector, which is an example of an electronic apparatus to which an electro-optical device is applied.

Next, the case where the liquid crystal device, which is the above described electro-optical device, is applied to various electronic apparatuses will be described with reference to FIG. 18. Here, FIG. 18 is a plan view that shows a configuration example of a projector. Hereinafter, a projector that uses the liquid crystal device as a light valve will be described.

As shown in FIG. 18, a projector 1100 installs therein a lamp unit 1102 formed of a white light source, such as a halogen lamp. Light projected from the lamp unit 1102 is split into three primary colors, that is, RGB, by four mirrors 1106 and two dichroic mirrors 1108, which are arranged in a light guide 1104 and then enter liquid crystal panels 1110R, 1110B and 1110G, which are light valves corresponding to the primary colors.

The configurations of the liquid crystal panels 1110R, 1110B and 1110G are equivalent to the above described liquid crystal device, and are respectively driven by primary color signals of R, G, B, which are supplied from an image signal processing circuit. Then, light modulated by these liquid crystal panels enters a dichroic prism 1112 from the three directions. In this dichroic prism 1112, R light and B light are refracted at a right angle while, on the other hand, G light goes straight. Thus, by composing images corresponding to the respective colors, a color image is projected onto a screen, or the like, through a projection lens 1114.

Here, focusing on display images by the liquid crystal panels 1110R, 1110B and 1110G, the display image by the liquid crystal panel 1110G needs to be mirror reversed relative to the display images of the liquid crystal panels 1110R, 1110B.

Note that, because rays of light corresponding to the primary colors of R, G, B enter the liquid crystal panels 1110R, 1110B and 1110G by the dichroic mirrors 1108, no color filter needs to be provided.

Note that, in addition to the electronic apparatus described with reference to FIG. 18, the electronic apparatus may include a mobile personal computer, a cellular phone, a liquid crystal television, a viewfinder type or a direct view type video tape recorder, a car navigation system, a pager, a personal organizer, an electronic calculator, a word processor, a workstation, a video telephone, a point-of-sales terminal, and devices provided with a touch panel. Then, of course, the aspects of the invention may be applied to the above various electronic apparatuses.

In addition, the aspects of the invention may be applied to a reflective liquid crystal device (LCOS) in which elements are formed on a silicon substrate, a plasma display (PDP), a field emission display (FED, SED), an organic EL display, a digital micromirror device (DMD), an electrophoretic device, or the like, in addition to the liquid crystal device described in the above embodiments.

The invention is not limited to the above described embodiments, and may be modified into various forms without departing from the spirit and scope of the invention as described in the appended claims and specification. The scope of the invention also encompasses the thus modified electro-optical device substrate, an electro-optical device that is provided with the electro-optical device substrate, and an electronic apparatus provided with the electro-optical device.

What is claimed is:

1. An electro-optical device including a pixel area of pixels each including an aperture region and a non-aperture region, the non-aperture regions separating aperture regions of adjacent pixels, the electro-optical device comprising:
    data lines that extend in a first direction;
    pixel electrodes located at corresponding ones of the pixels, the pixel electrodes including a first pixel electrode and a second pixel electrode that are located in a first pixel and a second pixel, respectively, the first and second pixels being adjacent to each other in a second direction that intersects the first direction;
    element portions each including a first semiconductor layer and a second semiconductor layer that extend in the first direction, the first and second semiconductor layers being separated from each other in the second direction being offset by substantially one pixel distance in the first direction, the first semiconductor layer includes:
        (i) a data line side source/drain region that is electrically connected to a corresponding one of data lines;
        (ii) a first channel region and a second channel region that are located on opposite sides of the first data line side source/drain region with respect to the first direction;
        (iiia) a first pixel electrode side source/drain region that is located on the opposite side of the first channel region along the first direction with respect to the data line side source/drain region and that is electrically connected to the first pixel electrode;
        (iiib) a second pixel electrode side source/drain region that is located on the opposite side of the second channel region along the first direction with respect to the data line side source/drain region and that is electrically connected to the second pixel electrode;
        (iv) a first junction region that is formed between the first channel region and the data line side source/drain region;
        (v) a second junction region that is formed between the first channel region and the first pixel electrode side source/drain region;
        (vi) a third junction region that is formed between the second channel region and the data line side source/drain region; and
        (vii) a fourth junction region that is formed between the second channel region and the second pixel electrode side source/drain region;
    a first light shielding portion that is formed at an upper layer side of the first semiconductor layer and that covers the first junction region;
    a second light shielding portion that is formed at an upper layer side of the first semiconductor layer and that covers the second junction region, the second light shielding portion having a width that is larger in the second direction than the first light shielding portion;
    a third light shielding portion that is formed at an upper layer side of the first semiconductor layer and that covers the third junction region; and
    a fourth light shielding portion that is formed at an upper layer side of the first semiconductor layer and that covers the fourth junction region, the fourth light shielding portion having a width that is larger in the second direction than the third light shielding portion, the first and third light shielding portions both being arranged in pixels that correspond to the first and second pixel electrodes,
    wherein the first light shielding portion and the third light shielding portion are both located in pixels that correspond to the first pixel electrode and the second pixel electrode.

2. The electro-optical device according to claim 1, wherein each of the first to fourth junction regions is an LDD region.

3. The electro-optical device according to claim 1, wherein each of the first to fourth light shielding portions is arranged immediately above the element portion that corresponds to the first semiconductor region.

4. The electro-optical device according to claim 1, further comprising:
    a first capacitive element that includes a pair of first capacitor electrodes and a first dielectric film located between the pair of first capacitor electrodes, the first and second light shielding portions serving as one of the first capacitor electrodes, the first capacitive element holding an electric potential of the first pixel electrode when an image signal is supplied through the first data line to the first pixel electrode; and
    a second capacitive element that includes a pair of second capacitor electrodes and a second dielectric film located between the pair of second capacitor electrodes, the third and fourth light shielding portions serving as one of the second capacitor electrodes, the second capacitive element holding an electric potential of the second pixel electrode when an image signal is supplied through the first data line to the second pixel electrode.

5. The electro-optical device according to claim 4, wherein at least one pair of capacitor electrodes between the pair of first capacitor electrodes and the pair of second capacitor electrodes is formed to include a conductive light shielding film.

6. An electro-optical device substrate comprising:

a substrate;

data lines;

scanning lines that intersect with the data lines on the substrate;

pixel electrodes that are respectively formed in pixels that are defined at positions corresponding to intersections of the data lines and the scanning lines and that form a display area on the substrate;

a first element portion, wherein, in a non-aperture region that separates aperture regions of the pixels, the first element portion is formed in a first region that extends along a first direction, in which the data line extends, along the first direction, wherein the first element portion has a first semiconductor layer, wherein the first semiconductor layer includes:

(i) a first data line side source/drain region that is electrically connected to a first data line of the data lines, the first data line extending along the first direction in the first region;

(ii) a first channel region and a second channel region that are located on both sides of the first data line side source/drain region along the first direction;

(iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the pixel electrodes;

(iv) a first junction region that is formed between the first channel region and the first data line side source/drain region;

(v) a second junction region that is formed between the first channel region and the first pixel electrode side source/drain region;

(vi) a third junction region that is formed between the second channel region and the first data line side source/drain region; and (vii) a fourth junction region that is formed between the second channel region and the second pixel electrode side source/drain region;

a second element portion, wherein, in the non-aperture region, the second element portion is formed in a second region that is located adjacent to the first region along a second direction that intersects with the first direction and that extends in the first direction, wherein the second element portion is formed offset by one pixel along the first direction as viewed from the first element portion, wherein the second element portion has a second semiconductor layer, wherein the second semiconductor layer includes:

(viii) a second data line side source/drain region that is electrically connected to a second data line of the data lines, the second data line extending along the first direction in the second region;

(ix) a third channel region that is formed on a side on which the first channel region is formed as viewed from the second data line side source/drain region in the first direction and a fourth channel region that is formed on a side on which the second channel region is formed;

(x) a third pixel electrode side source/drain region and a fourth pixel electrode side source/drain region that are respectively located on the outer side of the third channel region and on the outer side of the fourth channel region along the first direction as viewed from the second data line side source/drain region and electrically connected respectively to a third pixel electrode and a fourth pixel electrode that are different from each other among the pixel electrodes;

(xi) a fifth junction region that is formed between the third channel region and the second data line side source/drain region;

(xii) a sixth junction region that is formed between the third channel region and the third pixel electrode side source/drain region;

(xiii) a seventh junction region that is formed between the fourth channel region and the second data line side source/drain region; and (xiv) an eighth junction region that is formed between the fourth channel region and the fourth pixel electrode side source/drain region;

a first light shielding portion that is formed in an upper layer side than the first semiconductor layer along the first direction and covers the first junction region;

a second light shielding portion that is formed in an upper layer side than the first semiconductor layer and covers the second junction region, wherein the second light shielding portion has a width that is larger in the first second direction than the first light shielding portion;

a third light shielding portion that is formed in an upper layer side than the first semiconductor layer along the first direction and covers the third junction region;

a fourth light shielding portion that is formed in an upper layer side than the first semiconductor layer and covers the fourth junction region, wherein the fourth light shielding portion has a width that is larger in the second direction than the third light shielding portion;

a fifth light shielding portion that is formed in an upper layer side than the second semiconductor layer along the first direction and covers the fifth junction region;

a sixth light shielding portion that is formed in an upper layer side than the second semiconductor layer and covers the sixth junction region, wherein the sixth light shielding portion has a width that is larger in the second direction than the fifth light shielding portion;

a seventh light shielding portion that is formed in an upper layer side than the second semiconductor layer along the first direction and covers the seventh junction region; and an eighth light shielding portion that is formed in an upper layer side than the second semiconductor layer and covers the eighth junction region, wherein the eighth light shielding portion has a width that is larger in the second direction than the seventh light shielding portion, wherein the first pixel electrode and the second pixel electrode are arranged, among the pixels, in the pixels in which the first light shielding portion and the third light shielding portion are formed and which are located adjacent to each other along the second direction, and wherein the third pixel electrode and the fourth pixel electrode are arranged, among pixels, in the pixels in which the fifth light shielding portion and the seventh light shielding portion are formed and which are located adjacent to each other along the second direction.

7. The electro-optical device substrate according to claim 6, wherein each of the first to eighth junction regions is an LDD region.

8. The electro-optical device substrate according to claim 6, wherein each of the first to eighth light shielding portions is arranged immediately above the first element portion or the second element portion.

9. The electro-optical device substrate according to claim 6, wherein the first and second light shielding portions form a first capacitive element that includes a pair of first capacitor electrodes and a first dielectric film that is held between the pair of first capacitor electrodes, wherein the third and fourth light shielding portions form a second capacitive element that includes a pair of second capacitor electrodes and a second dielectric film that is held between the pair of second capacitor electrodes, wherein the fifth and sixth light shielding portions form a third capacitive element that includes a pair of third capacitor electrodes and a third dielectric film that is held between the pair of third capacitor electrodes, wherein the seventh and eighth light shielding portions form a fourth capacitive element that includes a pair of fourth capacitor electrodes and a fourth dielectric film that is held between the pair of fourth capacitor electrodes, wherein the first capacitive element holds an electric potential of the first pixel electrode when an image signal is supplied through the first data line to the first pixel electrode, wherein the second capacitive element holds an electric potential of the second pixel electrode when an image signal is supplied through the first data line to the second pixel electrode, wherein the third capacitive element holds an electric potential of the third pixel electrode when an image signal is supplied through the second data line to the third pixel electrode, and wherein the fourth capacitive element holds an electric potential of the fourth pixel electrode when an image signal is supplied through the second data line to the fourth pixel electrode.

10. The electro-optical device substrate according to claim 9, wherein at least one pair of capacitor electrodes among the pair of first capacitor electrodes, the pair of second capacitor electrodes, the pair of third capacitor electrodes and the pair of fourth capacitor electrodes is formed to include a conductive light shielding film.

11. An electro-optical device substrate comprising:
a substrate;
data lines;
scanning lines that intersect with the data lines on the substrate;
pixel electrodes that are respectively formed in pixels that are defined at positions corresponding to intersections of the data lines and the scanning lines and that form a display area on the substrate;
a first element portion, wherein, in a non-aperture region that separates aperture regions of adjacent pixels, the first element portion is formed in a first region that extends along a first direction, in which the data line extends, wherein the first element portion has a first semiconductor layer, wherein the first semiconductor layer includes:

(i) a first data line side source/drain region that is electrically connected to a first data line of the data lines, the first data line extending along the first direction in the first region;

(ii) a first channel region and a second channel region that are located on both sides of the first data line side source/drain region along the first direction;

(iii) a first pixel electrode side source/drain region and a second pixel electrode side source/drain region that are respectively located on the outer side of the first channel region and on the outer side of the second channel region along the first direction as viewed from the first data line side source/drain region and electrically connected respectively to a first pixel electrode and a second pixel electrode that are different from each other among the pixel electrodes;

(iv) a first junction region that is formed between the first channel region and the first data line side source/drain region;

(v) a second junction region that is formed between the first channel region and the first pixel electrode side source/drain region;

(vi) a third junction region that is formed between the second channel region and the first data line side source/drain region; and (vii) a fourth junction region that is formed between the second channel region and the second pixel electrode side source/drain region;

a second element portion, wherein, in the non-aperture region, the second element portion is formed in a second region that is located adjacent to the first region along a second direction that intersects with the first direction and that extends in the first direction, wherein the second element portion is formed offset by one pixel along the first direction as viewed from the first element portion, wherein the second element portion has a second semiconductor layer, wherein the second semiconductor layer includes:

(viii) a second data line side source/drain region that is electrically connected to a second data line of the data lines, the second data line extending along the first direction in the second region;

(ix) a third channel region that is formed on a side on which the first channel region is formed as viewed from the second data line side source/drain region in the first direction and a fourth channel region that is formed on a side on which the second channel region is formed;

(x) a third pixel electrode side source/drain region and a fourth pixel electrode side source/drain region that are respectively located on the outer side of the third channel region and on the outer side of the fourth channel region along the first direction as viewed from the second data line side source/drain region and electrically connected respectively to a third pixel electrode and a fourth pixel electrode that are different from each other among the pixel electrodes;

(xi) a fifth junction region that is formed between the third channel region and the second data line side source/drain region;

(xii) a sixth junction region that is formed between the third channel region and the third pixel electrode side source/drain region;

(xiii) a seventh junction region that is formed between the fourth channel region and the second data line side source/drain region; and (xiv) an eighth junction region that is formed between the fourth channel region and the fourth pixel electrode side source/drain region;

a first light shielding portion that is formed in an upper layer side than the first semiconductor layer along the first direction and covers the first junction region;

a second light shielding portion that is formed in an upper layer side than the first semiconductor layer and covers the second junction region, wherein the second light shielding portion has a width that is larger in the second direction than the first light shielding portion;

a third light shielding portion that is formed in an upper layer side than the first semiconductor layer along the first direction and covers the third junction region;

a fourth light shielding portion that is formed in an upper layer side than the first semiconductor layer and covers the fourth junction region, wherein the fourth light shielding portion has a width that is larger in the second direction than the third light shielding portion;

a fifth light shielding portion that is formed in an upper layer side than the second semiconductor layer along the first direction and covers the fifth junction region;

a sixth light shielding portion that is formed in an upper layer side than the second semiconductor layer and covers the sixth junction region, wherein the sixth light shielding portion has a width that is larger in the second direction than the fifth light shielding portion;

a seventh light shielding portion that is formed in an upper layer side than the second semiconductor layer along the first direction and covers the seventh junction region; and an eighth light shielding portion that is formed in an upper layer side than the second semiconductor layer and covers the eighth junction region, wherein the eighth light shielding portion has a width that is larger in the second direction than the seventh light shielding portion, wherein:

the first pixel electrode is arranged in pixels that are adjacent to each other along the second direction and that both include the second light shielding portion, the second pixel electrode is arranged in pixels that are adjacent to each other in the second direction and that both include the fourth light shielding portion, the third pixel electrode is arranged pixels that are adjacent to each other in the second direction and that both include the sixth light shielding portion, and the fourth pixel electrode is arranged that are adjacent to each other in the second direction and that both include the eighth light shielding portion.

* * * * *